United States Patent
Li et al.

(10) Patent No.: US 12,181,716 B2
(45) Date of Patent: Dec. 31, 2024

(54) MULTICORE OPTICAL FIBER CONNECTOR ADAPTERS

(71) Applicant: Corning Research & Development Corporation, Corning, NY (US)

(72) Inventors: Ming-Jun Li, Horseheads, NY (US); Qi Wu, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 253 days.

(21) Appl. No.: 17/974,706

(22) Filed: Oct. 27, 2022

(65) Prior Publication Data
US 2024/0061184 A1   Feb. 22, 2024

Related U.S. Application Data

(60) Provisional application No. 63/398,644, filed on Aug. 17, 2022.

(51) Int. Cl.
*G02B 6/38* (2006.01)

(52) U.S. Cl.
CPC ......... *G02B 6/3825* (2013.01); *G02B 6/3846* (2013.01)

(58) Field of Classification Search
None
See application file for complete search history.

(56) References Cited

U.S. PATENT DOCUMENTS

| | | | |
|---|---|---|---|
| 6,773,167 B2 * | 8/2004 | Scanzillo | G02B 6/3806 439/460 |
| 8,801,301 B2 | 8/2014 | Bradley et al. | |
| 8,858,089 B2 | 10/2014 | Bradley et al. | |
| 9,151,923 B2 | 10/2015 | Nielson et al. | |
| 9,322,987 B2 | 4/2016 | Doany et al. | |
| 9,366,829 B2 | 6/2016 | Czosnowski et al. | |
| 9,429,721 B2 * | 8/2016 | Nielson | G02B 6/3851 |
| 9,535,221 B2 | 1/2017 | Bradley | |

(Continued)

FOREIGN PATENT DOCUMENTS

JP   5491440 B2   5/2014

OTHER PUBLICATIONS

Pinguet, T., et al., "Silicon photonics multicore transceivers", 2012 IEEE Photonics Society Summer Topical Meeting Series, 2012, pp. 238-239.

(Continued)

*Primary Examiner* — Rhonda S Peace
(74) *Attorney, Agent, or Firm* — Adam R. Weeks

(57) ABSTRACT

In one embodiment, a multicore optical fiber connector adapter includes at least one multicore optical fiber stub that includes a plurality of optical cores, each optical core having an inner core and an outer core, a fiber coupling section having a first diameter, wherein the cores have a first pitch at the fiber coupling section, a multicore fiber coupling section having a second diameter that is less than the first diameter, wherein the cores have a second pitch at the multicore fiber coupling section that is less than the first pitch, and a taper section between the fiber coupling section and the multicore fiber coupling section. The multicore optical fiber connector adapter further includes at least one multicore ferrule comprising a passageway, a multicore connector, a plurality of optical fibers, and a multi-fiber ferrule.

25 Claims, 20 Drawing Sheets

(56) References Cited

U.S. PATENT DOCUMENTS

| | | | |
|---|---|---|---|
| 9,568,684 | B2 | 2/2017 | Bradley et al. |
| 10,317,629 | B2 | 6/2019 | Nielson et al. |
| 11,086,085 | B2* | 8/2021 | Morishima ........... G02B 6/3885 |
| 2010/0178007 | A1* | 7/2010 | Thomson ................. G02B 6/30 264/1.25 |
| 2012/0328244 | A1* | 12/2012 | Sasaki .................... G02B 6/403 385/59 |
| 2013/0044978 | A1 | 2/2013 | Dedobbelaere et al. |
| 2017/0269322 | A1 | 9/2017 | Benjamin et al. |
| 2018/0356590 | A1* | 12/2018 | Amma ................... G02B 6/036 |
| 2022/0026639 | A1* | 1/2022 | Namekawa ........ G02B 6/02042 |
| 2022/0236492 | A1* | 7/2022 | Correa ............... G02B 6/44715 |
| 2023/0138454 | A1* | 5/2023 | Li ...................... G02B 6/02042 385/126 |
| 2024/0061184 | A1* | 2/2024 | Li ....................... G02B 6/3885 |

OTHER PUBLICATIONS

Shikama, K. et al., "Multicore-fiber receptacle with compact fan-in/fan-out device for SDM transceiver applications" Journal of Lightwave Technology, vol. 36, No. 24, Dec. 2018, pp. 5815-5822.

Tetsu Morishima, et al., "Simple-structure low-loss multi-core fiber LC connector using an align-by-contact method", Optics Express, vol. 29, 2021, pp. 9157-9164.

* cited by examiner

MULTICORE OPTICAL FIBER CONNECTOR ADAPTERS

CROSS REFERENCE TO RELATED APPLICATIONS

This application claims the benefit of priority of U.S. Provisional Application Ser. No. 63/398,644 filed on Aug. 17, 2022, the content of which is relied upon and incorporated herein by reference in its entirety.

FIELD

The disclosure is directed to multicore optical fiber to single-core optical fiber adapters and, more particularly, to multicore optical fiber connector adapters having a reduced size.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G, and the like. As optical fiber extends deeper into communication networks there exists a need for building more complex and flexible fiber optic networks in a quick and easy manner.

Multicore fibers (MCF) have been intensively studied in the last two decades as one of the ways to improve the transmission capacity of optical fibers. Application of MCF for long haul applications was slow in part because of the rapid advances of transmission rate in coherence communications as well as the high cost associated with laying out new long haul cables. However, the rapid growth of hyperscale datacenters opens a new opportunity of MCF. Although the distance within a datacenter campus is typically less than 2 km, a massive number of fibers is used to interconnect the buildings or regional campuses. At the same time, the high-fiber count cables are deployed through existing ducts, which have limited space. As the need for fiber count continues to increase, MCF provides a much needed relieve in duct space.

One component in a MCF-based fiber link is the fan-in fan-out (FI/FO) device, which breaks out each optical core in a MCF to separate single-core optical fibers. The device operates by routing the optical cores with a small pitch from the MCF and converting the small pitch into a wider pitch for connectivity to standard single-core optical fibers (e.g., 125 μm optical fibers).

Present MCF fan-in fan-out have several disadvantages, including high insertion loss and also expensive and complicated manufacturing requirements. Conventional MCF fan-in fan out devices are bulky. The device packages measure as long as 150 mm. Even with connectors on both ends of the pigtails, the device package itself is still difficult to blend in with other fiber cables and requires additional space to secure in place.

Consequently, there exists an unresolved need for MCF fan-in fan-out devices having low insertion loss, lend themselves to high volume production and automation, and are provided in a small package

SUMMARY

Various embodiments of multicore optical fiber connector adapters are disclosed. More particularly, compact fan-in, fan-out devices are integrated into a connector, such as a duplex multicore optical fiber connector, resulting in a simple adaptor or a patch cord with a multi-fiber connector on the other end (e.g., an eight fiber multi-fiber push-on connector on the other end). This compact device converts a plurality of optical fibers from a plurality of parallel single mode transceivers or multiple transceivers into a simple multicore interface.

In one embodiment, a multicore optical fiber connector adapter includes at least one multicore optical fiber stub that includes a plurality of optical cores, each optical core having an inner core and an outer core, a fiber coupling section having a first diameter, wherein the plurality of optical cores has a first pitch at the fiber coupling section, a multicore fiber coupling section having a second diameter that is less than the first diameter, wherein the plurality of optical cores has a second pitch at the multicore fiber coupling section that is less than the first pitch, and a taper section between the fiber coupling section and the multicore fiber coupling section. The multicore optical fiber connector adapter further includes at least one multicore ferrule comprising a passageway, wherein at least a portion of the multicore fiber coupling section is disposed within the passageway, a multicore connector, wherein the at least one multicore ferrule is disposed within the multicore connector, a plurality of optical fibers, wherein a first end of the plurality of optical fibers is optically coupled to the plurality of optical cores at the fiber coupling section, and a multi-fiber ferrule, wherein a second end of the plurality of optical fibers is disposed within the multi-fiber ferrule.

In another embodiment, a multicore optical fiber connector adapter including at least one multicore optical fiber stub including a plurality of optical cores, each optical core having an inner core and an outer core, a fiber coupling section having a first diameter, wherein the plurality of optical cores has a first pitch at the fiber coupling section, a multicore fiber coupling section having a second diameter that is less than the first diameter, wherein the plurality of optical cores has a second pitch at the multicore fiber coupling section that is less than the first pitch, and a taper section between the fiber coupling section and the multicore fiber coupling section. The multicore optical fiber connector adapter further includes at least one multicore ferrule including a first passageway, wherein at least a portion of the multicore fiber coupling section is disposed within the first passageway, at least one fiber coupling ferrule comprising a second passageway, wherein at least a portion of the fiber coupling section is disposed within the second passageway, a ferrule holder having a first end and a second end, wherein the at least one multicore ferrule is disposed in the ferrule holder at the first end and the at least one fiber coupling ferrule is disposed within the ferrule holder at the second end, and a connector body, wherein the at least one multicore ferrule, the at least one fiber coupling ferrule, and the ferrule holder are disposed within the connector body.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

DETAILED DESCRIPTION

Figure 1:
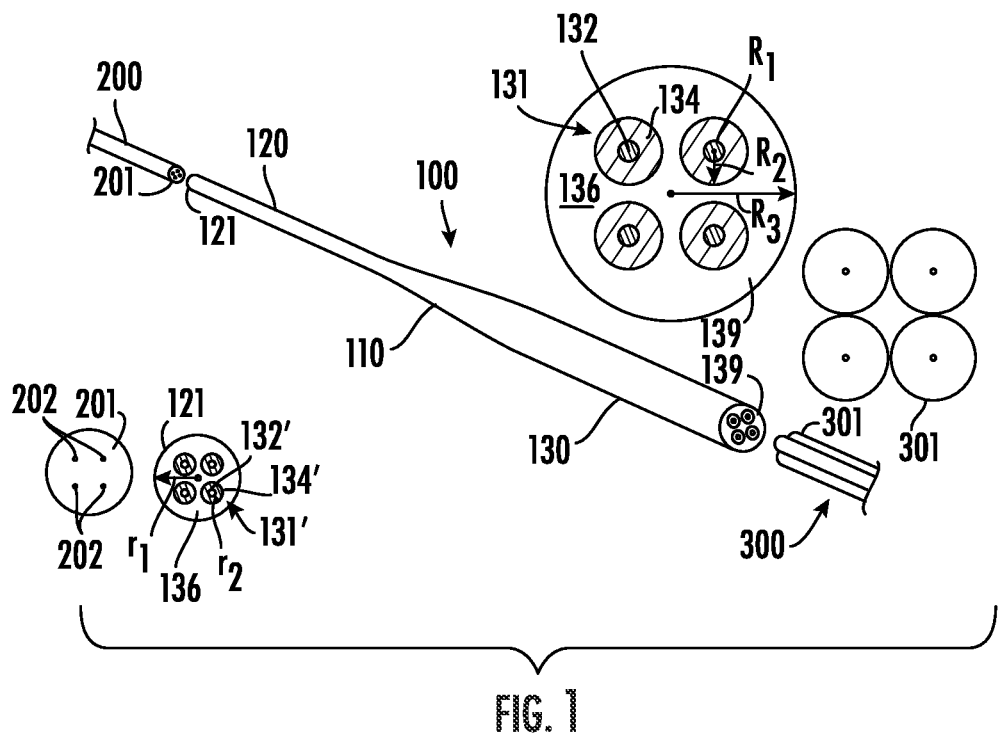
FIG. 1 schematically illustrates an example multicore optical fiber stub, an example multicore optical fiber, and an example bundle of single-core optical fibers according to one or more embodiments described and illustrated herein.

References will now be made in detail to the embodiments of the disclosure, examples of which are illustrated in the accompanying drawings. Whenever possible, like reference numbers will be used to refer to like components or parts.

The concepts disclosed are related to low-cost fan-in fan-out devices for multicore fiber (MCF) applications with low insertion loss as well as their manufacture. Previous fan-in, fan-out devices for solutions have been based on three types of technologies. The first technology is based on a reduced cladding fiber bundle. The reduced cladding fiber bundle is obtained through precisely etching the cladding to a diameter equal to half the core spacing of the MCF and stacking the fibers in a capillary or a ferrule. This is a highly delicate process and flaws may be generated that affect the long term reliability.

The second technology for fan-in fan-out devices is waveguide-based devices. With laser inscribed waveguides in glass, pitch conversion and transition from two dimensions to one dimension becomes feasible. The glass waveguide chip is then connected to fibers and a MCF using an active alignment process. However, waveguide-based fan-in fan-out devices are limited by insertion loss performance due to the waveguide propagation loss and the coupling loss.

The third technology is fiber-based devices. In this approach, the fan-out fibers are spaced at a proper spacing and placed inside a low index glass preform and tapered to very small diameter, where the fiber claddings become the "cores" and the low index tubing becomes the cladding. The taped end is fusion spliced to a MCF. This method produces lower insertion loss; however, the process is complicated and lacks scalability. Moreover, a more than 10× taper ratio is required to shrink the fiber cladding into the "core." Although the taper ratio can be reduced by using relay fibers with a second cladding, the need for a precision glass preform remains to hamper automation.

The multicore optical fiber fan-in, fan-out devices (FI/FO) of the present disclosure are highly manufacturable, have low insertion loss, and a small taper ratio (e.g., less than or equal to 4).

Today's transceivers are dominated by two types of fiber interfaces: parallel single mode which uses 8 fibers, and CWDM4 which uses 4 wavelengths in 2 fibers. To reduce the fiber count in datacenter links, one practical application is to convert the current parallel single mode transceivers such as PSM4 and DR4 which use 8 fibers in each transceiver into a simple duplex interface with two 2×2 core MCF. Parallel fiber transceivers are widely used in datacenters, both silicon photonics and DML/EML based transceivers support this format. Parallel single mode fiber transceivers are also considerably more cost effective and power efficient than CDWM base duplex transceivers such as FR4. On the other hand, four FR4 transceivers can also share a duplex MCF to further reduce the fiber count. In both cases, MCF FI/FO device is the key component to couple multiple single core fibers into a MCF.

Embodiments of the present disclosure improve the density and ease of use of FI/FO devices by integrating them into a connector housing so that the device can be handled as a fiber patch cord or a connector adaptor. Thus, compact MCF FI/FO devices are integrated into a connector, such as a duplex MCF connector, resulting in a simple adaptor or a patch cord with a multi-fiber connector, such as an eight fiber MTP connector, on the other end. This compact device converts eight fibers from a parallel single mode transceiver or four FR4 transceivers into a simple duplex MCF interface.

Various embodiments of multicore fiber stubs, multicore optical fiber fan-in, fan-out devices, as well as multicore optical fiber connector adapters are described in detail below.

Referring now to FIG. 1, an example multicore optical fiber stub 100 (MCF stub 100) along with a MCF 200 and a bundle of single-core optical fibers 300 are illustrated. The MCF stub 100 is operable to optically couple the optical cores 202 of the MCF 200 to the individual optical cores (not shown) of each optical fiber of the plurality of single-core optical fibers 300. The phrase "optically coupled" means that an optical signal passes between an interface with less than 1 dB optical loss.

Generally, the MCF stub 100 is the component that converts a fiber pitch from that of a bundled single-core optical fiber 300 to a core pitch matched to that of the MCF 200. The profile of the fiber cores in the MCF stub 100 is such that the mode field diameter of the cores stays consistent at the tapered and un-tapered ends. FIG. 1 illustrates a 2×2, four core MCF stub 100 as an example. It should be understood that devices for other MCF configurations and core numbers can be designed following the same approach of the embodiments described in the present disclosure.

The example MCF stub 100 comprises three sections: a fiber coupling section 130 which is operable to be coupled to the bundled single-core optical fibers 300; a taper section 110, and a multicore fiber coupling section 120 operable to be coupled to the MCF 200.

Within the fiber coupling section 130, the MCF stub has four cores 131 (i.e., core regions) defined by an inner core 132 and an outer core 134. The cores 131 are surrounded by a low index cladding 136. The cores 131 are exposed at a fiber coupling face 139 of the fiber coupling section 130.

The pitch and diameter of the cores 131' are reduced within the multicore fiber coupling section 120. As shown in FIG. 1, the multicore fiber coupling section 120 has an inner core 132', and outer core 134' and the low index cladding 136' that has a reduced diameter as compared to the low index cladding 136 at the fiber coupling section 130. The reduced-diameter cores 131' are exposed at a multicore fiber coupling face 121.

The lengths of the fiber coupling section 130 and the multicore fiber coupling section 120 are not limited by this disclosure; however, they each may be at least 5 mm long for handling in a subsequent fusion splicing process. The length of taper section 110 may be such to allow loss-less adiabatic transition of the mode in the inner cores into the new composite core 131' formed by the tapered inner and outer cores. As non-limiting examples, the length of the taper section 100 may be at least 500 μm to ensure low transition loss. The length of the taper section may be greater than 600 μm, greater than 800 μm, greater than 1 mm, greater than 2 mm, or greater than 5 mm. The transition loss may be less than 1 dB, less than 0.5 dB, or less than 0.1 dB.

In one non-limiting example, the MCF 200 has four cores in a 2×2 array with a core-to-core pitch of 45 μm, and the bundled single-core optical fibers 300 each have a diameter of about 125 μm. In this example, the taper ratio of the taper section 110 is 2.78:1, which is substantially smaller than that of existing vanishing core technology. In embodiments of the present disclosure, the taper ratio of the taper section 110 is less than 5, less than 4, less than 3.5, or less than 3. The outer diameter of the fiber coupling section 130 of the MCF stub 100 is about 347.5 μm. With such a small diameter, the MCF stub 100 can be made continuously in long lengths using a fiber draw process with an applied protective coating. As described in more detail below, the optical fiber from which the MCF stub 100 is fabricated may be stored in reels until more MCF stubs 100 are needed to be made.

Figure 2:
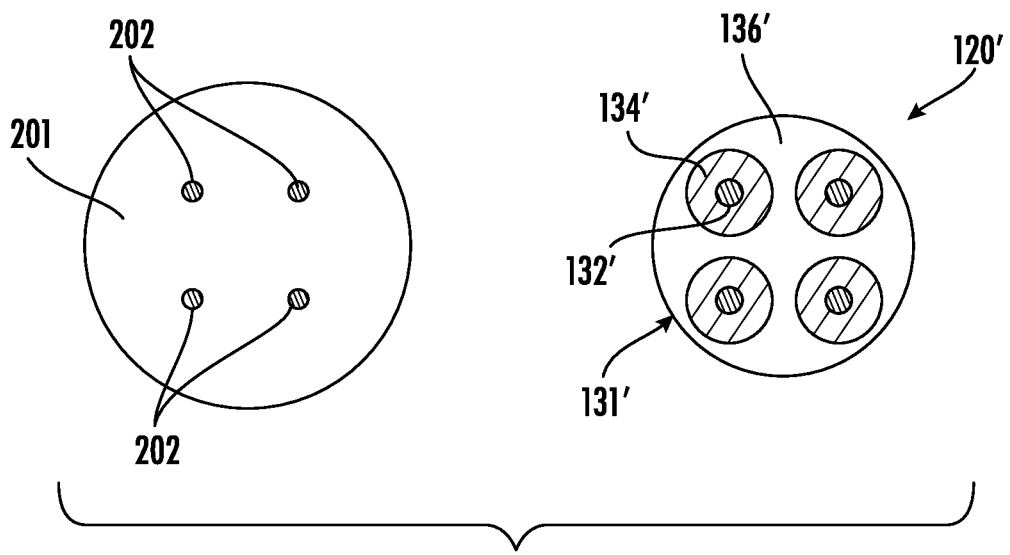
FIG. 2 schematically illustrates an example coupling face of a multicore optical fiber and an example multicore fiber coupling face of an example multicore optical fiber stub according to one or more embodiments described and illustrated herein.

In another non-limiting example, the outer diameter fiber coupling section 130 of the MCF stub 100 is matched to the peripheral diameter of the bundle of single-core optical fibers 300. For the 2×2 core MCF 200 and the 125 μm diameter single core fibers example, the outer diameter of the MCF stub 100 is designed to be about 301.8 μm. The diameter of the multicore fiber coupling section 120' is about 101.4 μm, as shown in FIG. 2, as compared to 125 μm in the example of FIG. 1. A marker (not shown) can be built in the MCF stub 100 for core identification as known in the art. The difference in outer diameter of the multicore fiber coupling section does not affect the insertion loss when spliced to the MCF fiber 200.

The MCF stubs 100 disclosed herein have index profiles with at least three regions. Particularly, the fiber coupling section 130 has a first index profile with at least three regions, and the multicore fiber coupling section 120 has a second index profile with at least three regions. There are two different profiles because of the change in core-to-core pitch due to the taper section 120 and the changing diameter of the MCF stub 100.

Figure 3A:
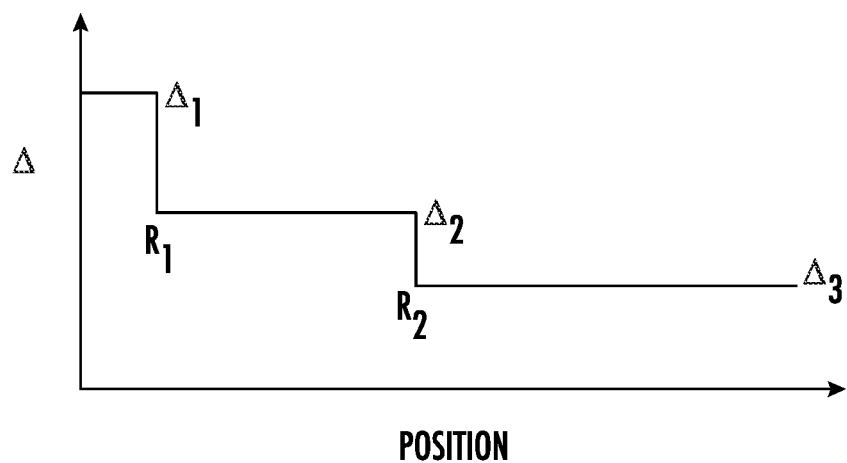
FIG. 3A illustrates an example first index profile of a fiber coupling section of an example multicore optical fiber stub according to one or more embodiments described and illustrated herein.

FIG. 3A illustrates an example first index profile of the fiber coupling section 130 of the MCF stub 100. The first index profile comprises three segments: an inner core segment provided by the inner core 132, an outer core segment provided by the outer core 134, and a cladding segment provided by the cladding 136. The inner core segment has a relative refractive index of $\Delta_1$ and a core radius of $R_1$ from the center of the inner core 132. The outer core segment has a relative refractive index of $\Delta_2$, and a core radius of $R_2$ from the center of the inner core 132. The cores are within the common low-index cladding 136 that has a relative refractive index of $\Delta_3$, and a radius of $R_c$ (not shown) from the fiber center. The diameter of the fiber coupling section 130 is $D=2R_c$. The relative index profile satisfies $\Delta_1>\Delta_2>\Delta_3$.

Figure 3B:
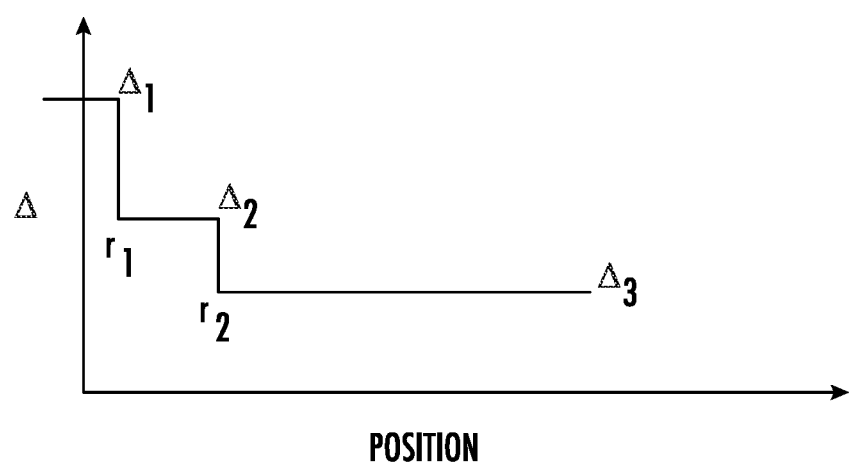
FIG. 3B illustrates an example second index profile of a multicore fiber coupling section of an example multicore optical fiber stub according to one or more embodiments described and illustrated herein.
Figure 4A:
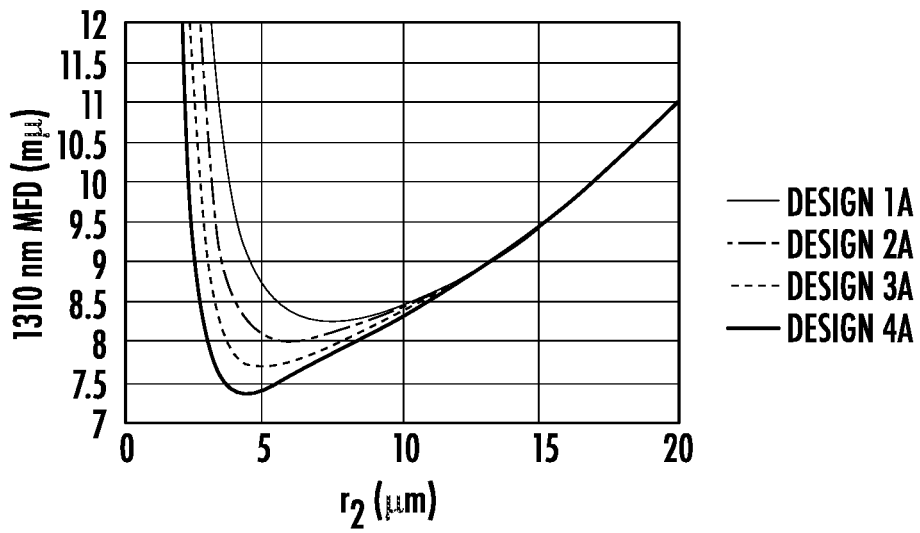
FIGS. 4A-4D are graphs that plot mode field diameter (MVFD) changes as a function of outer core radius $r_2$ after tapering at 1310 nm for fiber designs according to one or more embodiments described and illustrated herein.
Figure 4B:
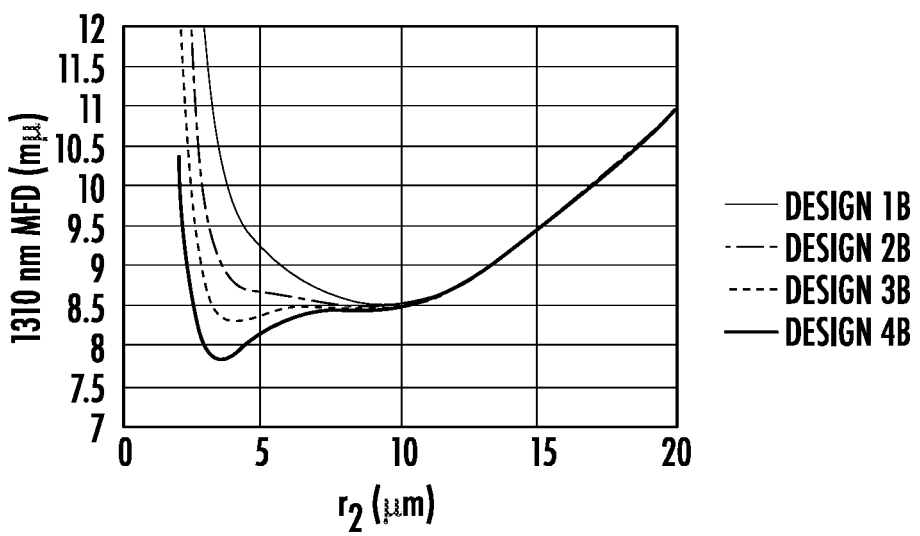
Figure 4C:
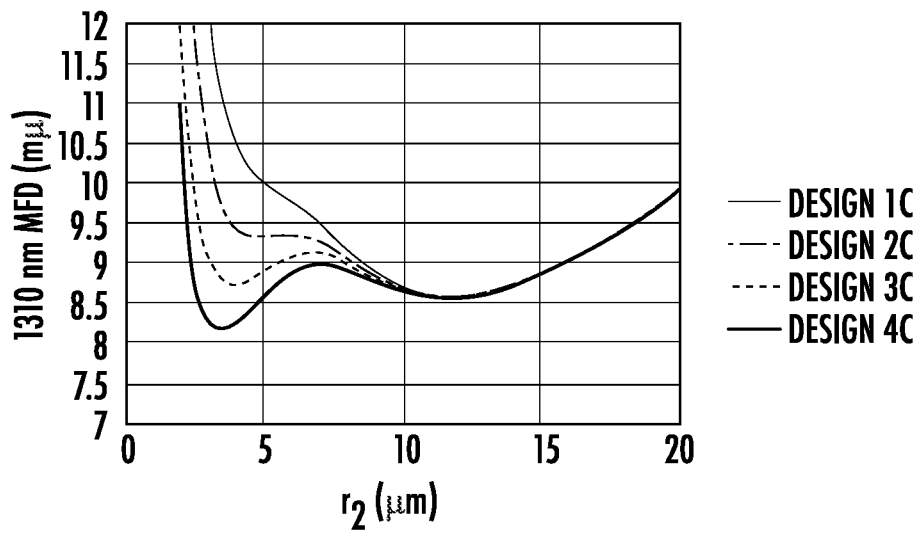
Figure 4D:
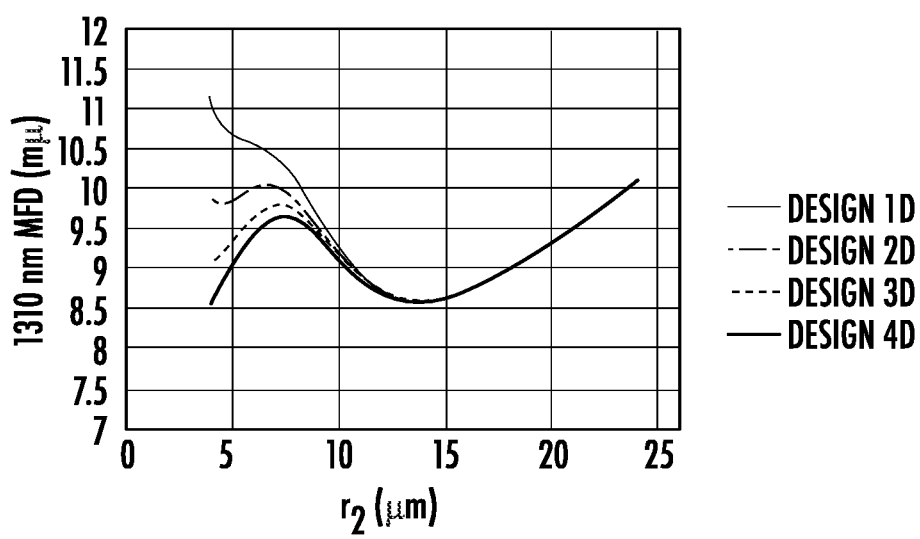
Figure 5A:
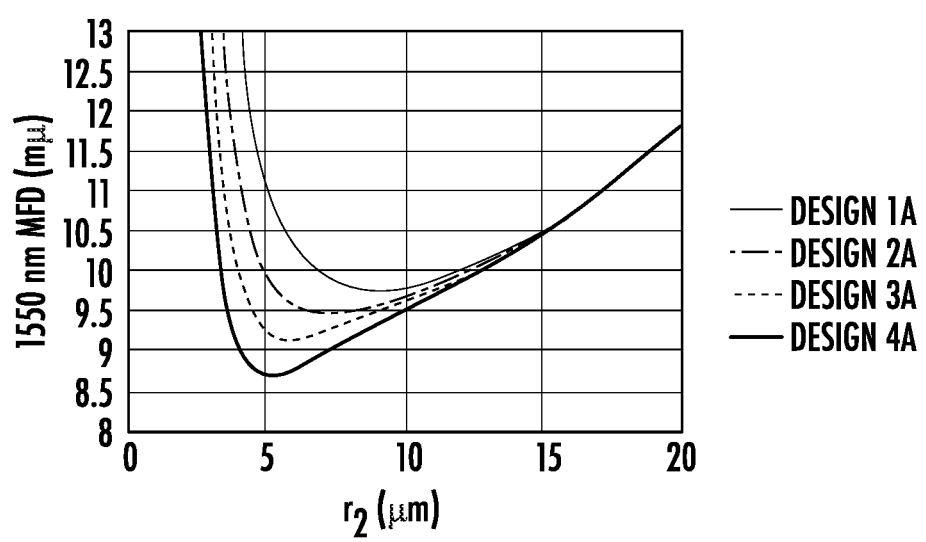
FIGS. 5A-5D are graphs that plot mode field diameter (MVFD) changes as a function of outer core radius $r_2$ after tapering at 1550 nm for fiber designs according to one or more embodiments described and illustrated herein.
Figure 5B:
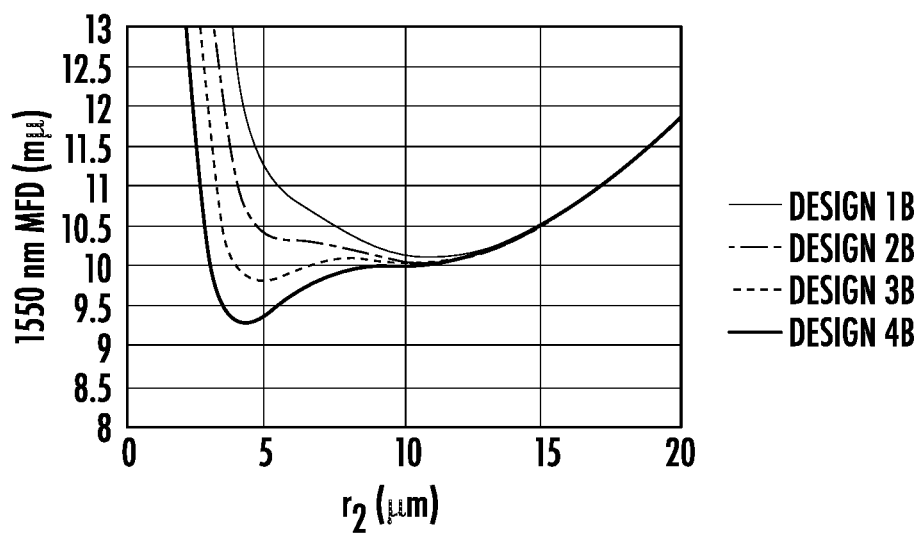
Figure 5C:
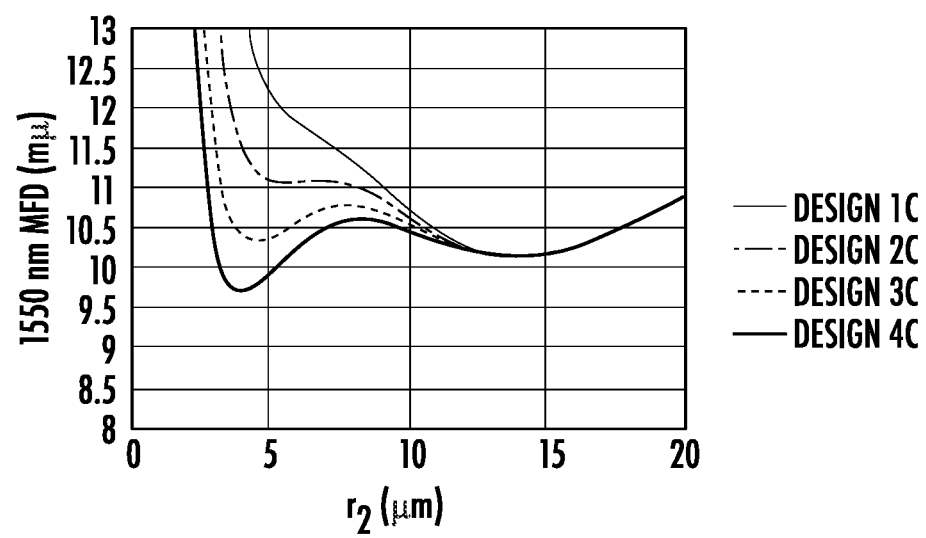
Figure 5D:
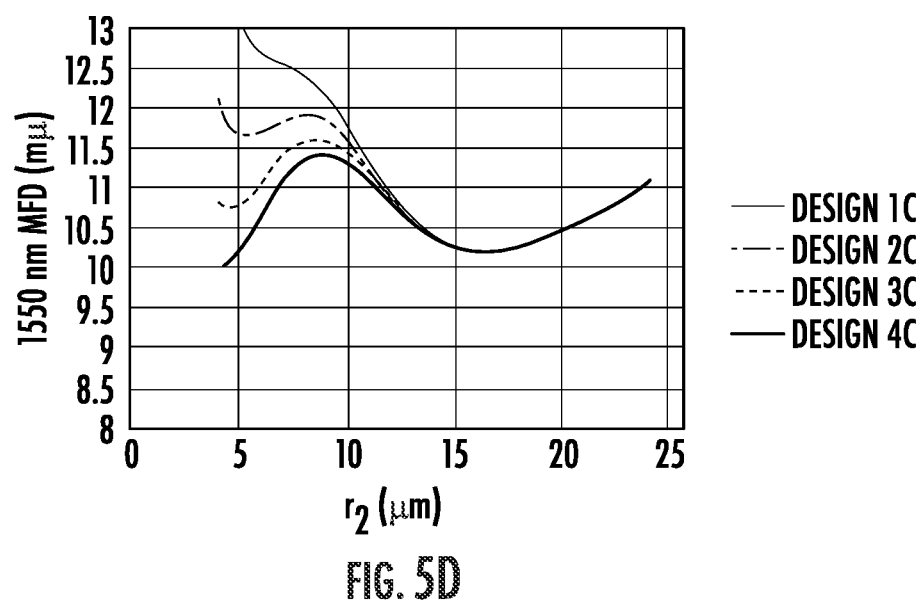

FIG. 3B illustrates an example second index profile of the multicore fiber coupling section 120 after tapering provided by the taper section 110. After tapering, the cladding diameter is reduced from $R_c$ to $r_c$ (not shown). The relative refractive indices of the inner core $\Delta_1$, the outer core $\Delta_2$ and the cladding $\Delta_3$ remain the same, but the inner and outer radii are reduced to $r_1$ and $r_2$. The diameter is reduced from D to $d=2r_c$ at the multicore fiber coupling section 120. The ratio of $R_1/r_1=R_2/r_2=R_c/r_c$ is the taper ratio. Although the profiles in FIG. 3A and FIG. 3B are ideal profiles with perfect step changes from each segment, it will be appreciated by those skilled in the art that dopant diffusions can happen during the manufacturing processes that make the profile transition rounded around the step changes without affecting the functionality of the fiber. Also, the profile can be designed with graded refractive index profiles, such as an alpha profile known in the art to have different shapes to achieve similar functionality of the fiber.

Sixteen experimental MCF stubs were designed having different taper ratios and different profile designs. The design parameters are shown in Tables 1A and 1B below. In these examples, the outer core was chosen to be pure silica glass with a relative refractive index $\Delta_2=0$. The inner core has a positive relative refractive index $\Delta_1>0$, which can be made with an up-dopant in silica glass, for example with Germanium (Ge), Titanium (Ti), Aluminum (Al), Phosphorus (P) or Chlorine (Cl). The cladding has a negative relative refractive index $\Delta_3<0$, which can be made with a down-dopant, for example, Fluorine (F), or Boron (B). The fiber can also be designed by choosing the cladding to be the pure silica with $\Delta_3=0$. In this case, the relative refractive index of both the inner and outer cores are shifted higher. The relative $\Delta$ differences between the inner core and the outer core, and between the outer core and the cladding remain about the same.

TABLE 1A

| Design | 1a | 1b | 1c | 1d | 2a | 2b | 2c | 2d |
|---|---|---|---|---|---|---|---|---|
| $\Delta_1$ | 0.34 | 0.34 | 0.34 | 0.34 | 0.34 | 0.34 | 0.34 | 0.34 |
| $\Delta_2$ | 0 | 0 | 0 | 0 | 0 | 0 | 0 | 0 |
| $\Delta_3$ | −0.15 | −0.15 | −0.15 | −0.15 | −0.20 | −0.20 | −0.20 | −0.2 |
| $R_2/R_1 = r_2/r_1$ | 0.413 | 0.330 | 0.275 | 0.236 | 0.413 | 0.330 | 0.275 | 0.236 |

TABLE 1B

| Design | 3a | 3b | 3c | 3d | 4a | 4b | 4c | 4d |
|---|---|---|---|---|---|---|---|---|
| $\Delta_1$ | 0.34 | 0.34 | 0.34 | 0.34 | 0.34 | 0.34 | 0.34 | 0.34 |
| $\Delta_2$ | 0 | 0 | 0 | 0 | 0 | 0 | 0 | 0 |
| $\Delta_3$ | −0.25 | −0.25 | −0.25 | −0.25 | −0.30 | −0.30 | −0.30 | −0.30 |
| $R_2/R_1 = r_2/r_1$ | 0.413 | 0.330 | 0.275 | 0.236 | 0.413 | 0.330 | 0.275 | 0.236 |

FIGS. 4A-4D plot the mode field diameter (MFD) changes as a function of outer core radius $r_2$ after tapering at 1310 nm for each of the sixteen experimental designs. Similarly, FIGS. 5A-5D plot the mode field diameter (MFD) changes as a function of outer core radius $r_2$ after tapering at 1550 nm for each of the sixteen experimental designs. From the plots of FIGS. 4A-4D and 5A-5D, one can choose the larger core radius before tapering and the small radius after tapering to have an MCF stub 100 with a MFD that matches the MFD of the multicore optical fiber 200 and the MFD of the single-core optical fibers 300. To obtain low insertion losses between the multicore optical fiber 200 and the single-core optical fibers 300, preferably the MFD mismatch at both ends of the MCF stub 100 is less than 1 μm, less than 0.5 μm, or less than 0.25 μm. A typical MFD range is between 8 μm and 11 μm at 1310 nm, and between 9 μm and 12 μm at 1550. A taper ratio between 2 and 4 may be utilized to match the mode field diameters at both ends of the MCF stub 100.

In addition to the sixteen designs of MCF stubs identified in Tables 1A and 1B, five multicore optical fiber fan-in, fan-out devices 10 (e.g., see FIG. 9) comprising a MCF stub 100 optically coupled to a MCF 200 and a bundle of single-core optical fibers 300 disposed within a housing were designed. The parameters of the five multicore optical fiber fan-in, fan-out devices are provided in Table 2 below.

TABLE 2

| | | Ex. 1 | Ex. 2 | Ex. 3 | Ex. 4 | Ex. 5 |
|---|---|---|---|---|---|---|
| | Core design | 2 × 2 | 2 × 2 | 2 × 2 | 1 × 4 | 7 cores |
| | Profile design | 1b | 3c | 4d | 1a | 4b |
| Large end | Core spacing S (μm) | 125 | 80 | 160 | 80 | 125 |
| | Inner core radius R1 (μm) | 4.62 | 2.06 | 4.27 | 5.82 | 3.96 |
| | Outer core radius R2 (μm) | 14 | 7.5 | 18.1 | 14.1 | 12 |
| | Fiber diameter D (μm) | 347.5 | 142.4 | 443.8 | 228.8 | 375 |
| | MFD at 1310 nm (μm) | 9.2 | 9.1 | 9.0 | 9.3 | 8.8 |
| | MFD at 1550 nm (μm) | 10.4 | 10.8 | 10.3 | 10.4 | 10.1 |
| Small end | Core spacing s (μm) | 45 | 45 | 45 | 28 | 41.7 |
| | Inner core radius $r_1$ (μm) | 1.65 | 1.16 | 1.2 | 2.1 | 1.32 |
| | Outer core radius $r_2$ (μm) | 5.03 | 4.2 | 5.1 | 5.1 | 4 |
| | Fiber diameter d (μm) | 125 | 80 | 125 | 80 | 125 |
| | MFD at 1310 nm (μm) | 8.7 | 8.8 | 9.0 | 8.6 | 7.9 |
| | MFD at 1550 nm (μm) | 10.4 | 10.4 | 10.3 | 10.9 | 9.3 |
| | Taper ratio | 2.78 | 1.78 | 3.55 | 2.86 | 3 |

As shown in Table 2, in these examples, core designs of 2×2 cores are arranged in a square around the core center, 1×4 cores arranged in a line across the center, and 7 cores with one core in the center and 6 cores arranged in a hexagonal shape. At the large end of the taper section 110, a core spacing of 125 and 80 μm can be used to adapt fiber arrays of with fiber diameter of the 125 and 80 μm. In Example 3, the core spacing is 160 μm, which can be used to attach individual single-core optical fibers without them touching one another. In all five examples, the diameter of the fiber coupling section 130 is less than 400 μm. As described in more detail below, the MCF fabrication process may be used to make such multicore fibers and wind them onto a fiber reel. Therefore, the proposed large diameter MCF can be made with long length and low costs. Because the taper ratio is less than 4, the multicore optical fiber fan-in, fan-out devices described herein are easy to make with low manufacturing costs.

Figure 6:
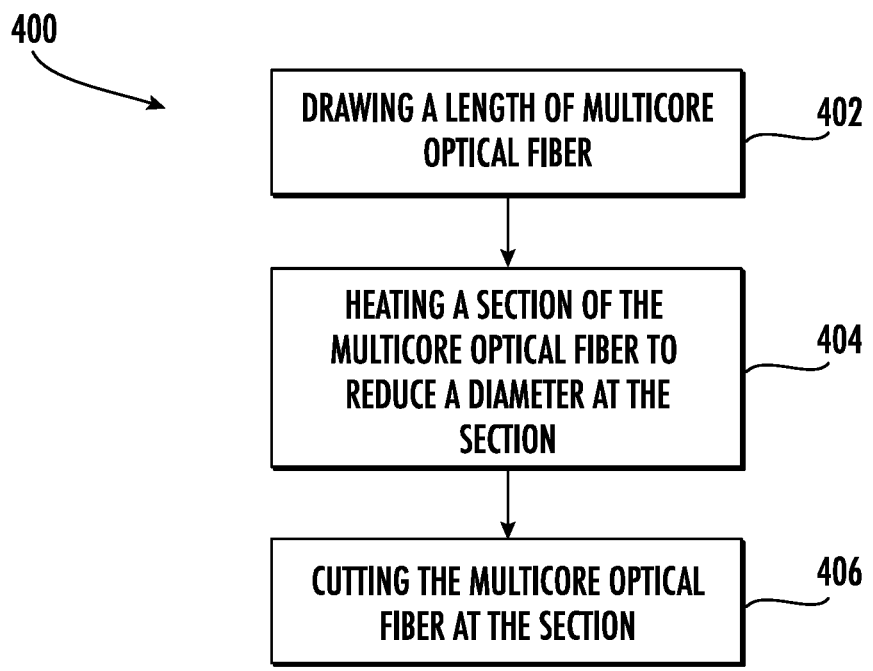
FIG. 6 is a flowchart illustrating an example process to fabricate a multicore optical fiber stub according to one or more embodiments described and illustrated herein.

FIG. 6 is a flowchart 400 illustrating an example method of fabricating a MCF stub 100. At block 402, a length of a MCF is drawn by any known or yet-to-be developed draw process. In one embodiment, a silica-based glass substrate blank and core canes are prepared first using a known fiber preform manufacturing process such as outside vapor deposition (OVD), modified chemical vapor deposition (MCVD) or plasma chemical vapor deposition (PCVD). The substrate blank and core canes are made according to a refractive index profile design with appropriate dopants that are described in previous sections. In some embodiments, the substrate blank has a diameter of in the range of 1 cm to 20 cm. In some embodiments, the core canes have a diameter of 1 mm to 20 mm. The substrate blank is drilled with multiple holes according to a multicore fiber structure design and the hole diameter is slightly larger than the cane diameter to enable the insertion of core canes into the holes. Then the core canes are inserted into the holes of the substrate blank and sealed by applying heat and vacuum to form a multicore preform. The multicore preform is then drawn into MCF using a fiber draw tower known in the art. The MCF may have any designed diameter and any number of optical cores in any desired core arrangement. In some embodiments, a polymeric coating layer or a dual polymeric coating including a primary coating layer and a secondary coating layer is applied to the drawn multicore optical fiber. The drawn multicore optical fiber may be wound in a reel. The fiber length may be greater than 1 m, greater than 10 m, greater than 100 m, greater than 1 km, or greater than 10 km.

Figure 7:
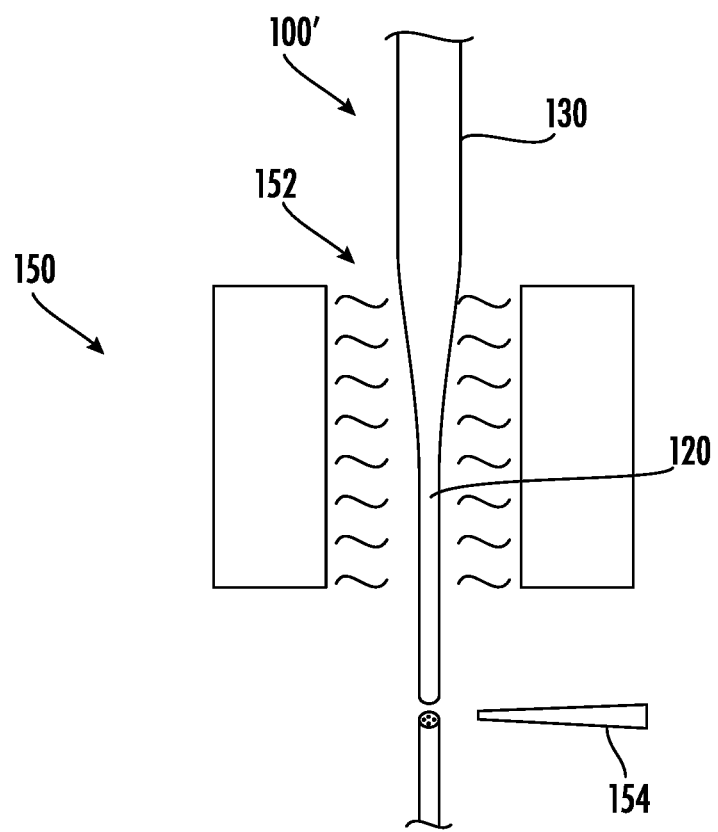
FIG. 7 schematically illustrates a tapering and cutting system for fabricating a multicore optical fiber stub according to one or more embodiments described and illustrated herein.

At block 404, a section of the MCF has its coating removed, and is heated to reduce the diameter of the MCF over a taper length. FIG. 7 illustrates an example heating process to reduce the diameter of a MCF 100'. A section of the MCF 100' is disposed within a heating device 150, which may be configured to completely enclose the portion of the MCF 100' or only partially enclose the portion of the MCF 100' (e.g., from one or more sides of the MCF 100'). The heating device 150 is operable to apply heat 152 to the MCF 100' to raise its temperature to above its softening point. As non-limiting example, the heating device 150 may be an electric arc, a resistive heater, or $CO_2$ lasers. In some embodiments, a pulling force is applied to the MCF 100' to form the taper section and reduce the diameter of the MCF 100'. In other embodiments, gravity causes the reduction in diameter of the MCF 100'. A diameter monitoring device may be used to control the diameter of the MCF 120 to get an accurate and uniform diameter.

The taper shape follows the taper profile described above. Because of the smaller diameter of the MCF 100' compared with a glass preform, the taper process is better controlled than tapering a multicore glass cane, typically around 1 to a few mm in diameter into a fiber of about 125 μm in diameter.

At block 406, the tapered MCF 100' is then cleaved off based on a pre-designed length. FIG. 7 illustrates a cleaving component 154 operable to cleave the MCF 100' to form the MCF stub 100. The cleaving may be done by a $CO_2$ laser, or an ultra-fast laser in the visible or near infrared wavelength range, or a mechanical device. Thus, the tapered MCF stubs described herein are automatically produced continuously without having to load the preforms and feeding the optical fibers through the preforms, which provides for high throughput.

Figure 8:
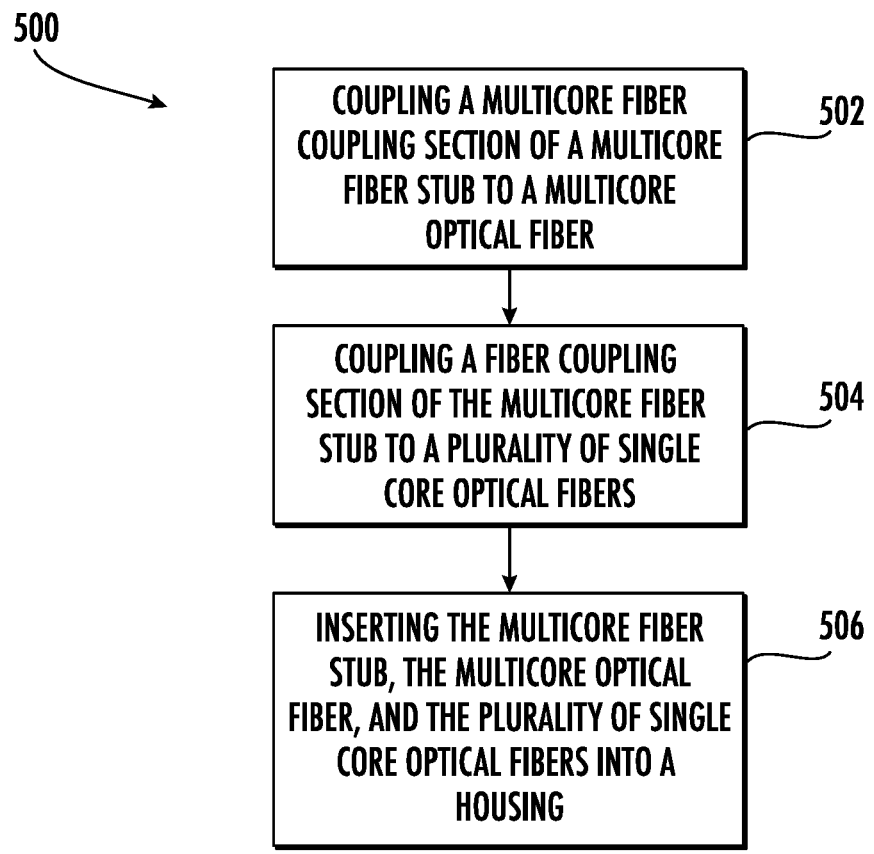
FIG. 8 is a flowchart illustrating an example process to fabricate a multicore fan-in, fan-out device according to one or more embodiments described and illustrated herein.

Referring now to FIG. 8, a flowchart 500 of an example process for fabricating a multicore fan-in, fan-out device 10 is provided. At block 502, a multicore fiber coupling section 120 of a MCF stub 100 is coupled to a MCF 200. The other end of the MCF 200 may be terminated with a MCF connector. At block 504, a fiber coupling section 130 of the MCF stub 100 is coupled to a plurality of single-core optical fibers 300. The other end of the plurality of single-core optical fibers 300 may be terminated by individual single-mode fiber connectors. In some embodiments, the coupling between the MCF stub 100 and the MCF 200 and the plurality of single-core optical fibers 300 is effectuated by fusing splicing.

The multicore fiber coupling section matches the MCF in both core pitch and mode field diameter. Very low insertion loss is obtained through fusion splicing. At the fiber coupling section, single-core optical fibers, (e.g., single-core optical fibers or single-core optical fibers with titanium doped strength layer) are stripped of coating and bundled into a 2×2 array matching the core pattern of the MCF stub 100. When a titanium doped stress layer is present, the bare optical fiber can be handled without mechanical defects. In some embodiments, the bundled single-core optical fiber 300 has a pitch of 125 μm. Alternatively, smaller cladding diameter fiber with or without titanium cladding layer can be used to further reduce the taper ratio. With a 125 μm cladding diameter, the single-core optical fibers 300 can be terminated using standard connector ferrules. Once again, because of the relatively smaller diameter of the MCF stub 100 compared with glass preforms, fusion splicing of the un-tapered end to the bundle of single-core optical fibers 300 is feasible using a similar heat source as that used in the tapering process. In another embodiment, the single-core optical fibers 300 may be laser-fused to the fiber coupling face 139 sequentially but at a larger pitch than 125 μm. In this case, a larger core pitch in the MCF stub 100 and a higher taper ratio may be needed.

Figure 9:
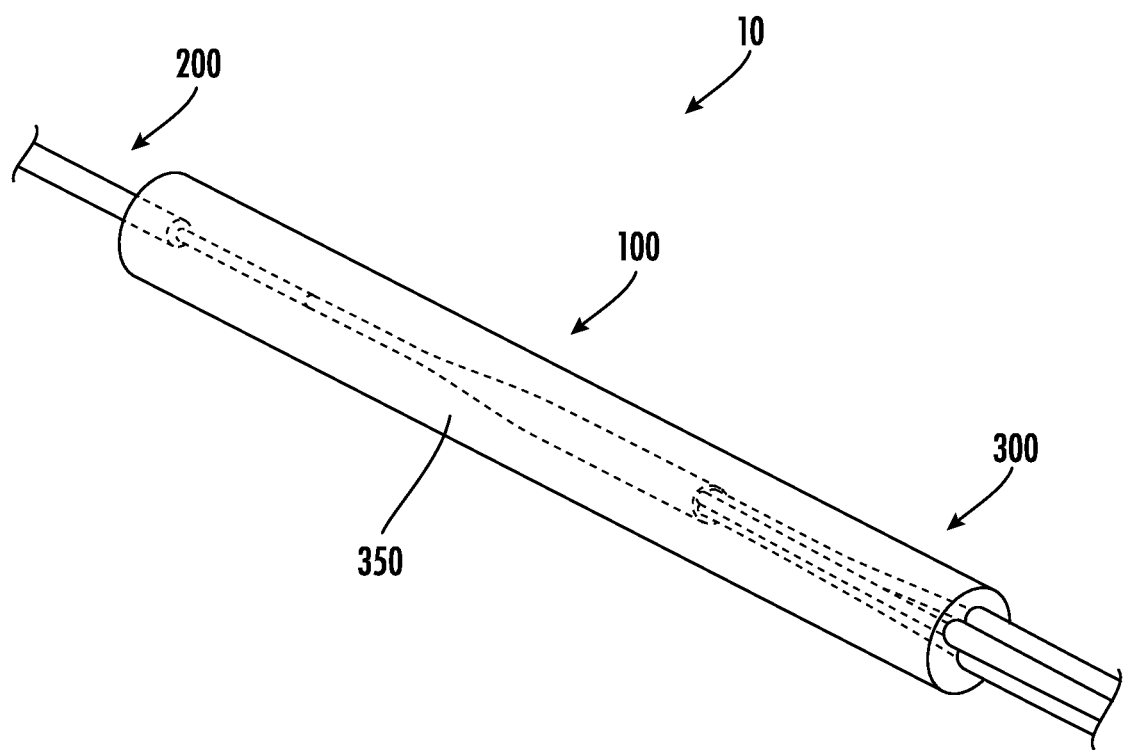
FIG. 9 schematically illustrates an example multicore fan-in, fan-out device according to one or more embodiments described and illustrated herein.

At block 506 of FIG. 8, the MCF stub 100 and a portion of the MCF 200 and a portion of the bundle of single-core optical fibers 300 into a housing 350, an example of which is shown in FIG. 9. The housing 350 may be rigid, such as fabricated from a hard polymer. In other embodiments, the housing 350 may be flexible (e.g., fabricated from a heat shrink material, such as a soft polymer). The exposed fibers are encapsulated in polymeric material.

Figure 10:
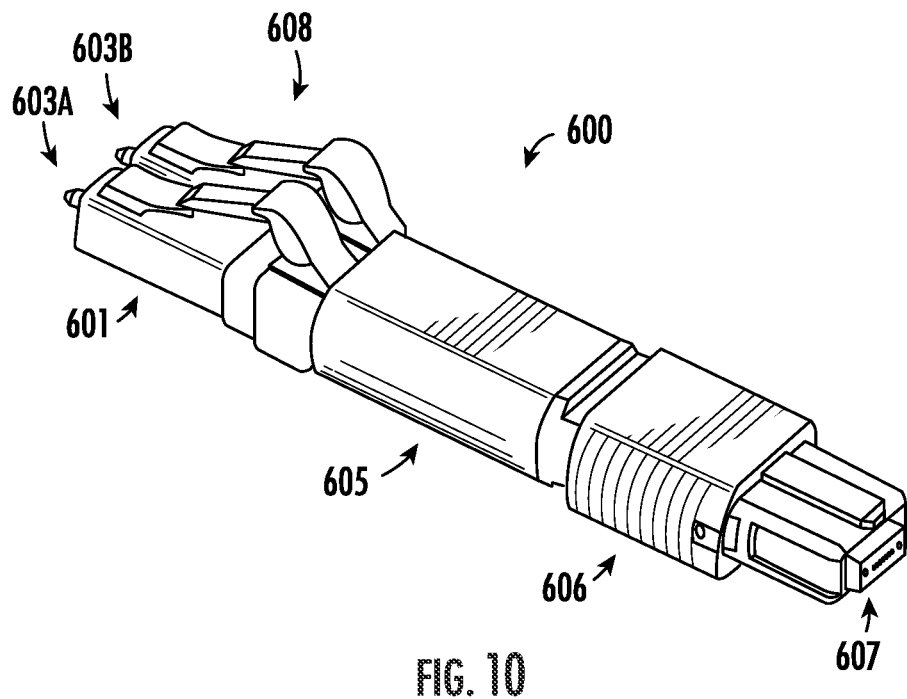
FIG. 10 schematically illustrates an example multicore optical fiber connector adapter according to one or more embodiments described and illustrated herein.

The MCF stubs 100 disclosed herein may be incorporated into multicore optical fiber connector adapters that enable a connector having a multicore fiber to be optically coupled to a connector having individual single core optical fibers. Referring now to FIG. 10, a perspective view of an example multicore optical fiber connector adapter 600 is illustrated. The example adapter 600 generally includes a multicore fiber connector 601 for mating with mated multicore fiber connector(s), an adapter housing 605, and a multi-fiber connector 606 for mating to a mated multi-fiber connector. Although not shown in FIG. 10, the adapter 600 includes two MCF stubs 100 disposed within the multicore fiber connector 601, the adapter housing 605, and the multi-fiber connector 606.

The adapter housing 605 has a first end that is coupled to an end of the multicore fiber connector 601, and a second end that is coupled to an end of the multi-fiber connector 606. The adapter housing 605 may be fabricated from any suitable material, such as rigid plastic. Environmental sealing members (e.g., O-rings, not shown) may be provided between the adapter housing 605 and the multicore fiber connector 601 and the multi-fiber connector 606.

The multicore connector 601 of the example adapter 600 is configured as a duplex connector. Thus, in this embodiment, the adapter 600 includes two MCF stubs 100A, 100B (see FIG. 13, described below). However, it should be understood that in other embodiments, less than two or more than two MCF stubs 100 may be included and therefore embodiments are not limited to duplex connectors for the multicore connector.

Figure 11:
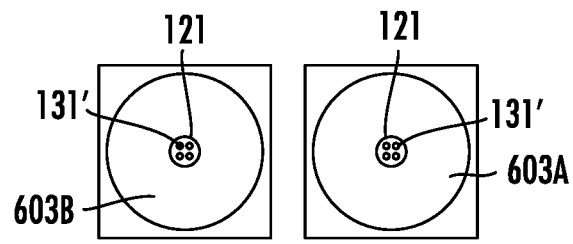
FIG. 11 schematically illustrates a front view of two example multicore ferrules according to one or more embodiments described and illustrated herein.
Figure 12:
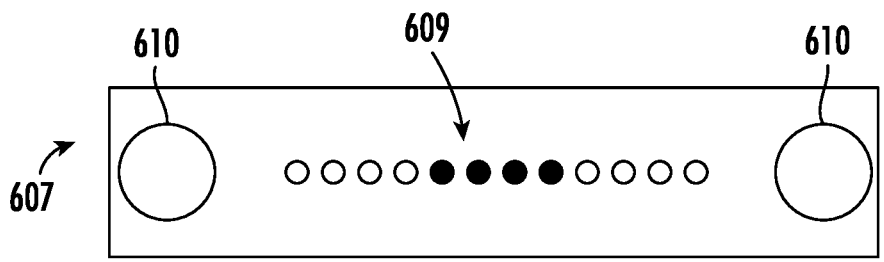
FIG. 12 schematically illustrates a front view of an example multi-fiber ferrule according to one or more embodiments described and illustrated herein.

The multicore connector 601 comprises a connector body 608 providing a duplex connector. Within each connector of the duplex connector are two multicore ferrules 603A, 603B. Each of the two multicore ferrules 603A, 603B are cylindrical in shape similar to that of an LC connector ferrule. FIG. 11 illustrates a front view of the two multicore ferrules 603A, 603B. Each multicore ferrule 603A, 603B includes a passageway that a fiber coupling section 120 of an individual MCF stub 100 is disposed within such that the multicore fiber coupling face 121 is exposed at the tip of the multicore ferrule 603A, 603B. The reduced-diameter cores 131' are exposed at the multicore fiber coupling face 121 for mating with a multicore fiber of a mated multicore connector (not shown). Thus, the multicore connector 601 of the embodiments of the present disclosure may be configured as a standard duplex connector (e.g., LC, SC, SN, and MDC) but mate with more than two optical fibers of mated optical connectors. The use of small form-factor duplex connectors is enabled by the MCF stubs 100 of the present disclosure, which have a small diameter and a short length.

The diameter of the multicore fiber coupling section 120 may be controlled to a tolerance better than 0.5 μm to match the diameter of the passageway of a typical ferrule, such as an LC ferrule, which is comparable to that of fiber cladding diameters.

Figure 13:
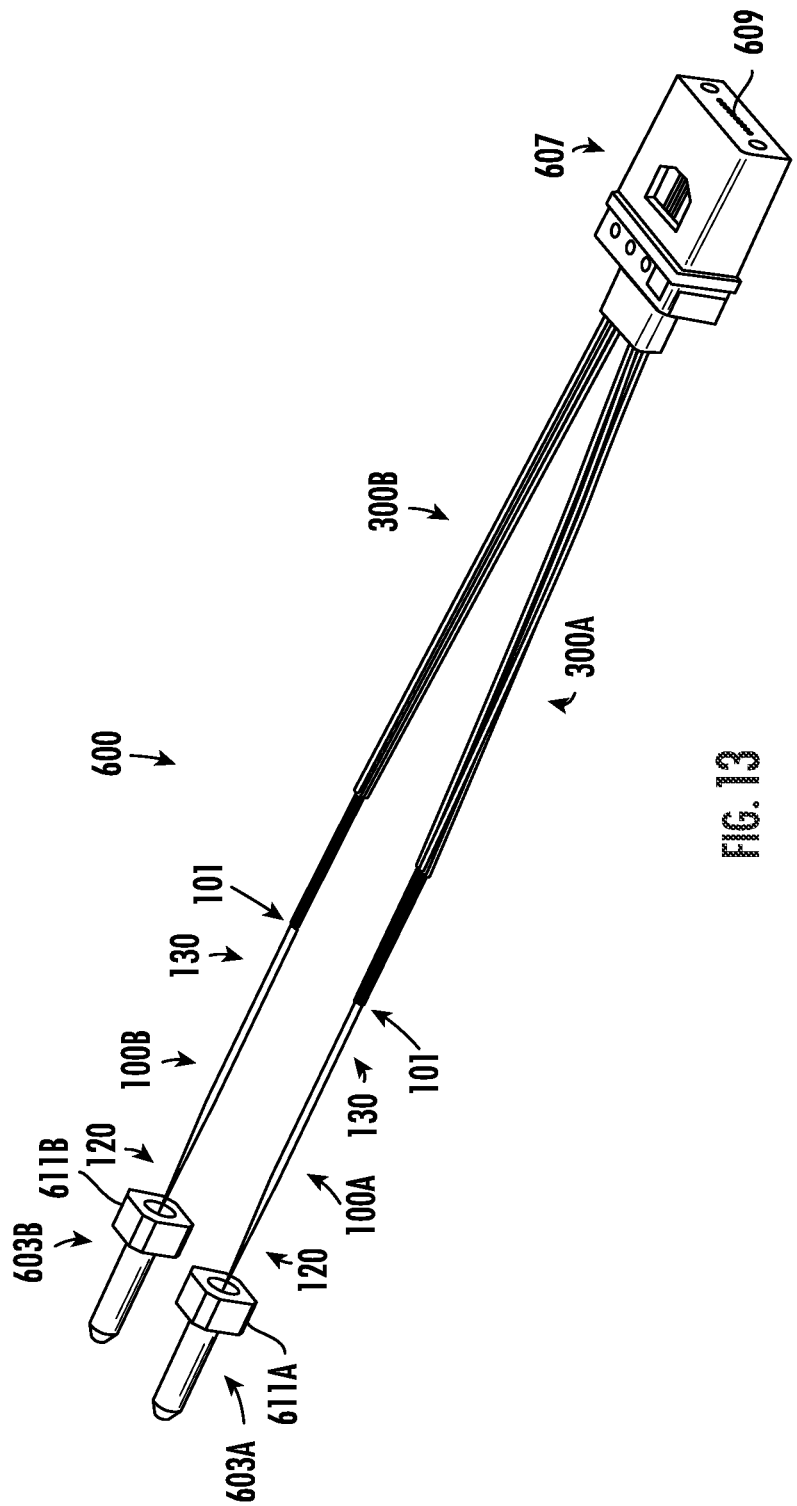
FIG. 13 schematically illustrates example internal components of the example multicore optical fiber connector adapter shown in FIG. 10 according to one or more embodiments described and illustrated herein.

The multi-fiber connector 606 includes a multi-fiber ferrule 607 operable to maintain a plurality of single-core optical fibers. Although the multi-fiber ferrule 607 and the multi-fiber connector 606 is illustrated as a multi-fiber push-on (MPO) connector, embodiments are not limited thereto. The multi-fiber connector 606 (including the multi-fiber ferrule 607) may be configured as any known or yet-to-be-developed multi-fiber connector. FIG. 13 illustrates a front face of the multi-fiber ferrule 607 shown in FIG. 11. The example multi-fiber ferrule 607 includes two alignment mating features 610, which may be configured as pins or holes, and an array of fiber bores 609. Although FIG. 13 illustrates twelve fiber bores 609, any number of fiber bores may be provided.

Figure 14:
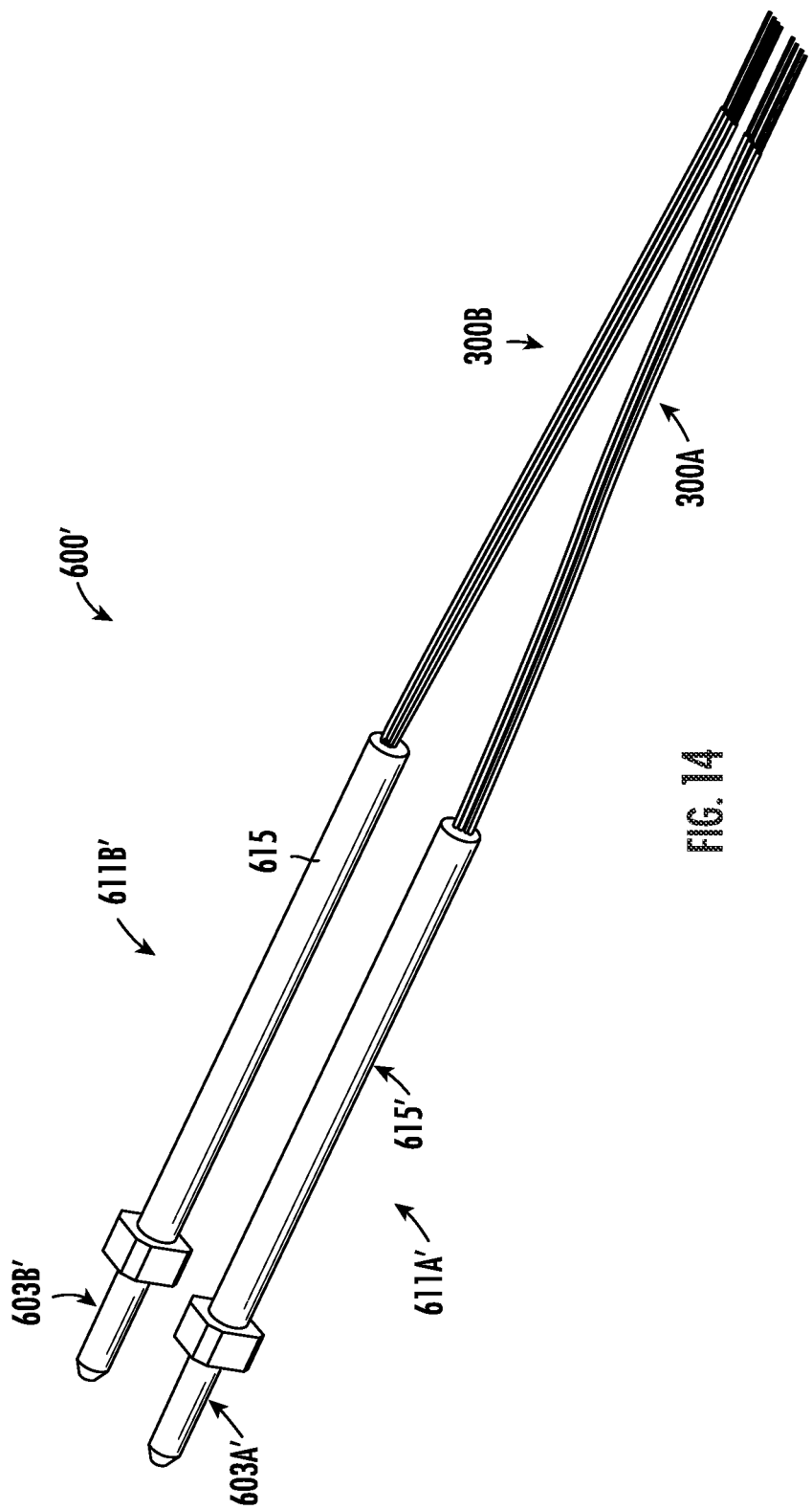
FIG. 14 schematically illustrates other example internal components of the example multicore optical fiber connector adapter shown in FIG. 10 according to one or more embodiments described and illustrated herein.

Referring now to FIG. 14, a perspective view of the adapter 600 shown by FIG. 10 having the multicore connector 601, the adapter housing 605, and the multi-fiber connector 606 removed is provided. In the illustrated example, the adapter 600 includes two MCFs 100A, 100B, two ferrule holders 611A, 611B and two multicore ferrules 603A, 603B. The multicore fiber coupling section 120 of each MCF 100A, 100B is disposed within the two ferrule holders 611A, 611B and two multicore ferrules 603A, 603B, respectively. The multicore fiber coupling sections 120 may be secured within the two ferrule holders 611A, 611B and the two multicore ferrules 603A, 603B. A plurality of single-core optical fibers comprises a first set of single-core optical fibers 300A and a second set of single-core optical fibers 300B that are coupled to the single-cores of the fiber coupling section 130. As a non-limiting example, the first set of single-core optical fibers 300A and the second set of single-core optical fibers 300B are coupled to the single-cores of the fiber coupling section 130 by a fusion splice 101.

As second end of the first and second single-core optical fibers 300A, 300B are disposed within the bores 609 of the multi-fiber ferrule 607. The first and second single-core optical fibers 300A, 300B may be secured within the bores 609 with an adhesive, for example.

FIG. 14 illustrates the internal components of another adapter 600' similar to that of the internal components of the adapter of FIG. 13 except that each of the ferrule holders 611A', 6111B' has an extended portion 615 such that at least a portion of the taper section 110 and the fiber coupling section 130 are disposed in a passageway of the extended portion 615 to protect the two MCFs 100A, 100B.

Figure 15:
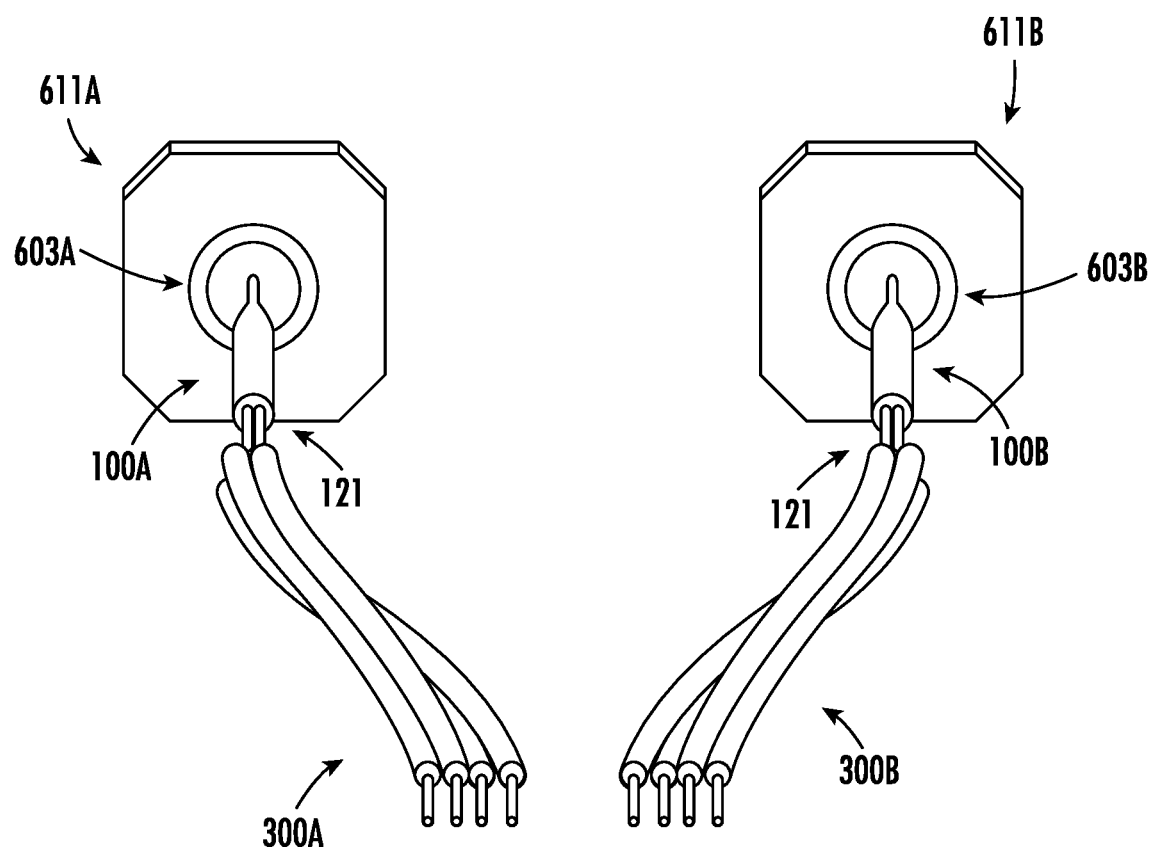
FIG. 15 schematically illustrates a rear view of two ferrule holders, two multicore ferrules, and two sets of optical fibers according to one or more embodiments described and illustrated herein.

FIG. 15 illustrates a rearview of the first and second ferrule holders 611A, 611B and the first and second ferrules 603A, 603B disposed therein. As shown by FIG. 15, the first and second MFCs 100A, 100B are disposed within the passageways of the first and second ferrules 300A, 300B, respectively. The exposed cores of the first and second sets of single-core optical fibers 300A, 300B are spliced to the cores 132 at the fiber coupling face 131 by way of a fusion splice. The polarity of the single-core optical fibers may follow the standard of parallel single mode transceivers, for example. The connector pattern of the first and second ferrules 603A, 603B to the first and second MCFs 100A, 100B may be controlled by the fiber bundle splicing process, for example.

Figure 16:
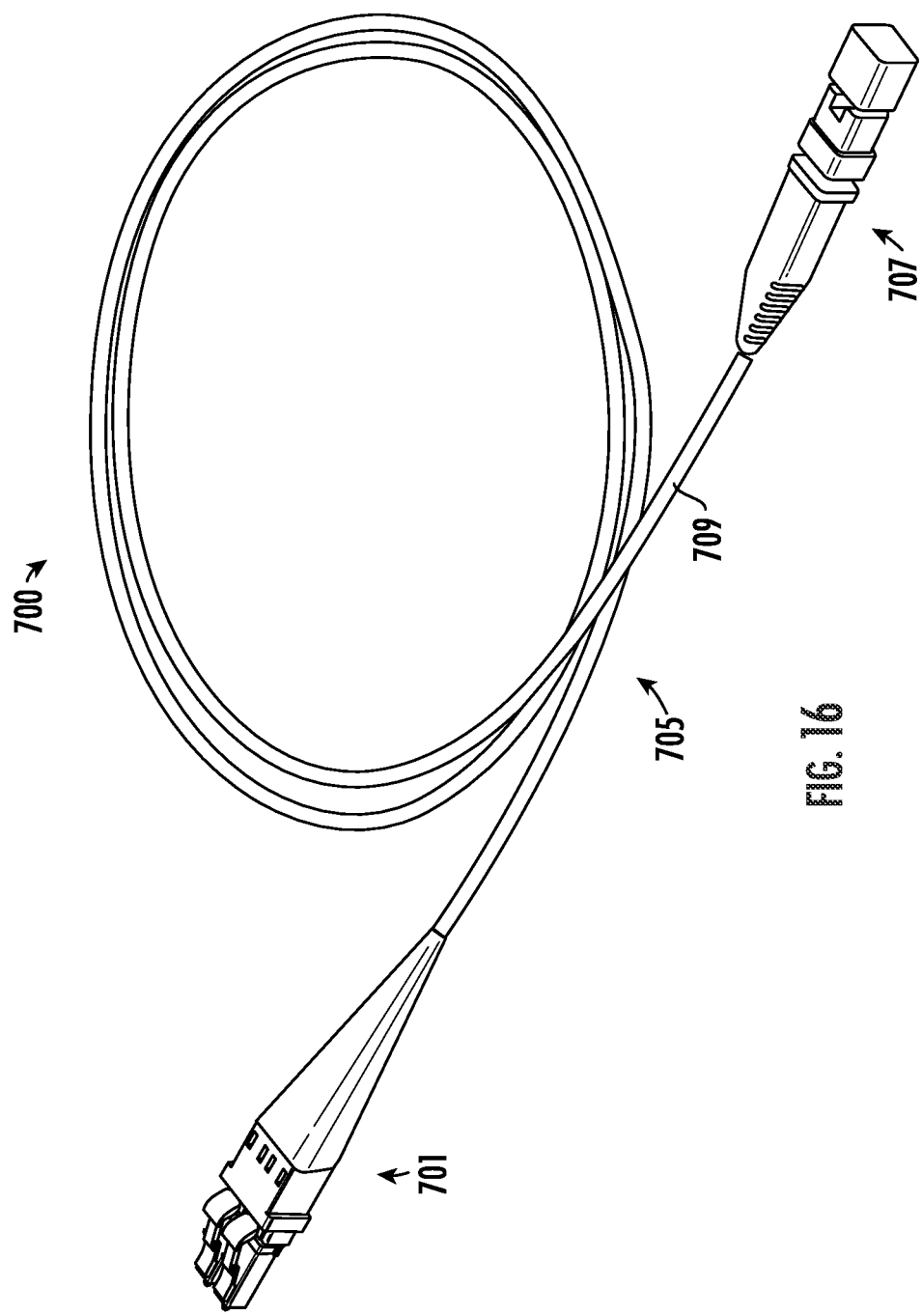
FIG. 16 schematically illustrates another example multicore optical fiber connector adapter configured as a patch cord according to one or more embodiments described and illustrated herein.

FIG. 16 illustrates another example of an adapter 700 that is configured as an adapter patch cord. Rather than an adapter housing as shown in FIG. 10, the adapter 700 of FIG. 16 uses an optical cable 705 comprising a cable jacket 709 that surrounds the plurality of optical fibers (e.g., the first and second sets of optical fibers 300A, 300B). One end of the optical cable 705 is terminated at a multicore fiber connector 701 and the other end of the optical cable 705 is terminated at a multi-fiber connector 707. The multicore fiber connector 701 may be configured as a duplex connector as shown by FIG. 16, or another type of optical connector. Both the MCFs 100A, 100B may be maintained within the multicore fiber connector 701. The multi-fiber connector 707 may be an MPO-type connector as shown by FIG. 16 or another type of optical connector.

Figure 17:
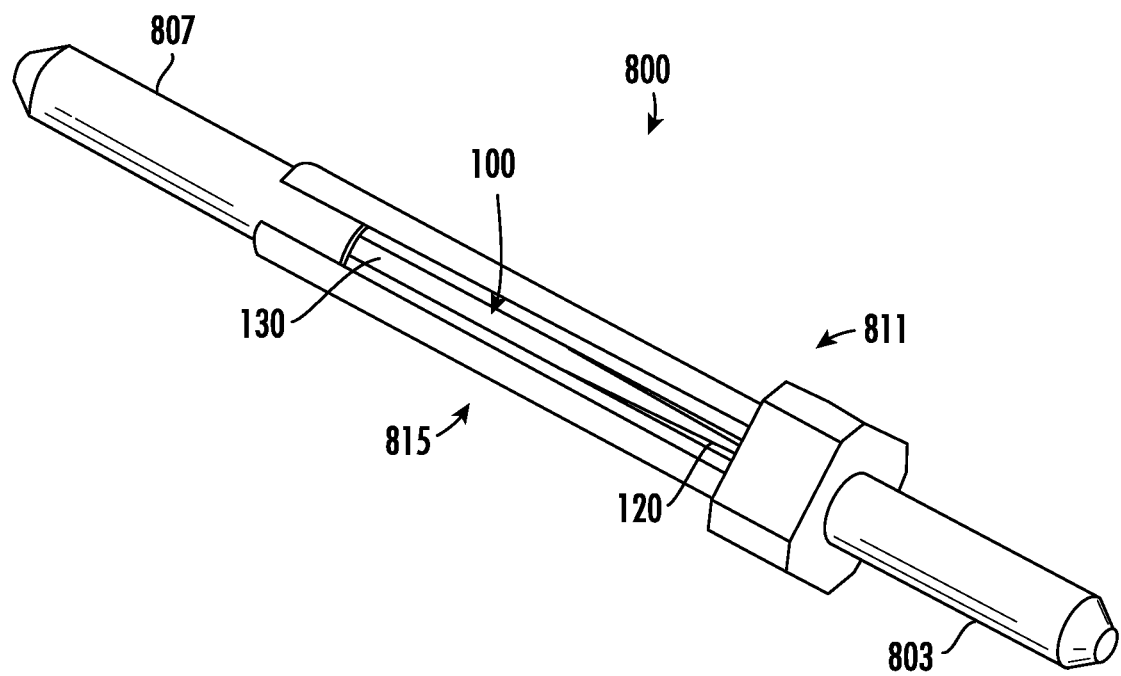
FIG. 17 schematically illustrates another example multicore optical fiber connector adapter comprising a ferrule holder, a multicore ferrule, a multi-fiber ferrule, and a MCF stub according to one or more embodiments described and illustrated herein.

FIG. 17 illustrates another example of an adapter 800 that includes a ferrule holder 811 having a passageway, a multicore ferrule 803 inserted in a first end of the passageway of the ferrule holder 811, a fiber coupling ferrule 807 inserted in a second end of the passageway of the ferrule holder 811, and a MCF 100. The MCF 100, the multicore ferrule 803, and the fiber coupling ferrule 807 may be secured within the ferrule holder 811 by an adhesive. A portion of the MCF 100 is disposed within the passageway of the ferrule holder 811, which has an extended portion 815. At least a portion of the fiber coupling section 130 of the MCF 100 is disposed within a passageway of the fiber coupling ferrule 807, and at least a portion of the multicore fiber coupling section 120 is disposed within a passageway of the multicore ferrule 803.

Figure 18:
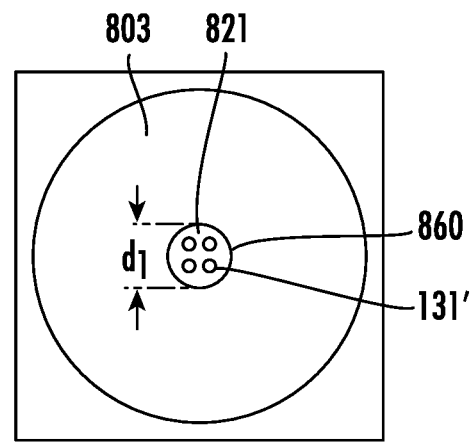
FIG. 18 schematically illustrates a front face of the multicore ferrule shown by FIG. 17 according to one or more embodiments described and illustrated herein.

FIG. 18 illustrates a front face view of the multicore ferrule 803 shown in FIG. 17, which is similar to the multicore ferrules 603A, 603B depicted in FIG. 11. The passageway of the multicore ferrule 803 defines an opening 860 at its end. The opening 860 has a diameter $d_1$ that provides a close fit for the multicore coupling section 120. The multicore fiber coupling face 121 is exposed at the end of the multicore ferrule 803 through the opening 860.

Figure 19:
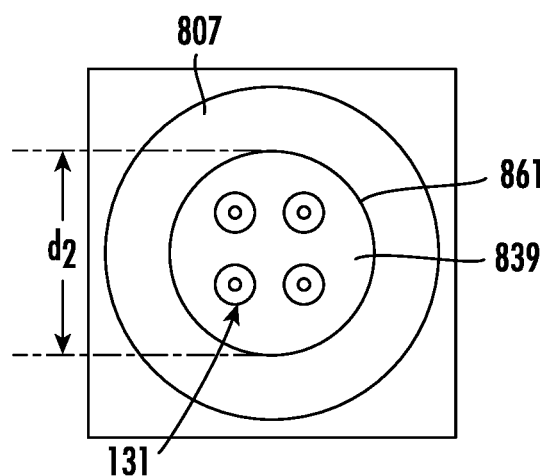
FIG. 19 schematically illustrates a front face of the multi-fiber ferrule shown by FIG. 17 according to one or more embodiments described and illustrated herein.

FIG. 19 illustrates a front face view of the fiber coupling ferrule 807 shown in FIG. 17, which, rather than being configured as an MPO ferrule, is a cylindrical ferrule. The passageway of the fiber coupling ferrule 807 defines an opening 861 at its end. The opening 861 has a diameter $d_2$ that provides a close fit for the fiber coupling section 130. Because the diameter of the fiber coupling section 130 is larger than the diameter of the multicore coupling section 120, diameter $d_2$ is greater than diameter $d_1$.

The fiber coupling face 839 is exposed at the end of the fiber coupling ferrule 807 through the opening 861, thereby providing access to the exposed cores at the fiber coupling face 131 for optical coupling to a mated connector. The fiber coupling ferrule 807 is operable to be mated to a special ferrule with a large inner diameter passageway holding a bundle of four single-core optical fibers.

Figure 20A:
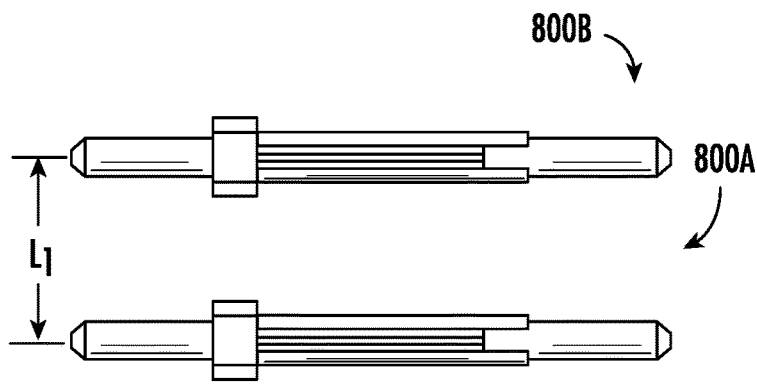
FIG. 20A schematically illustrates two multicore optical fiber connector adapters having a first spacing according to one or more embodiments described and illustrated herein.
Figure 20B:
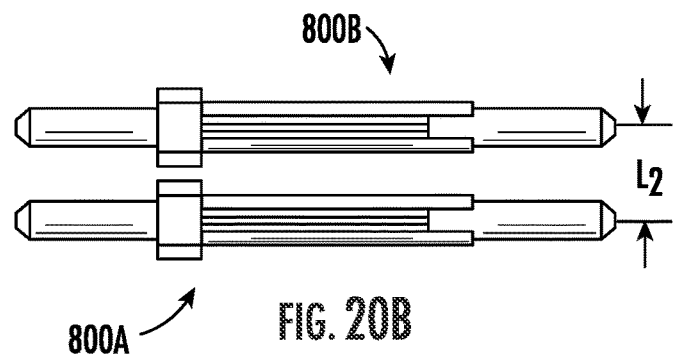
FIG. 20B schematically illustrates two multicore optical fiber connector adapters having a second spacing according to one or more embodiments described and illustrated herein.

FIGS. 20A and 20B illustrate how two adapters 800A, 800B can be provided for a duplex connector at various spacings. In FIG. 20A, the two adapters 800A, 800B are spaced at a distance $L_1$. In FIG. 20B, the two adapters 800A, 800B are spaced at a distance $L_2$, wherein $L_1$ is greater than $L_2$. As non-limiting examples, $L_1$ may be 6.25 mm to provide spacing for LC duplex connectors, and $L_2$ may be 3.1 mm to provide spacing for small form-factor connectors, such as MDC and SN connectors. It is noted that the small form-factor of the MCFs 100 described herein enable the MCFs 100 to be integrated into a standard LC connector as well as smaller connectors.

Figure 21:
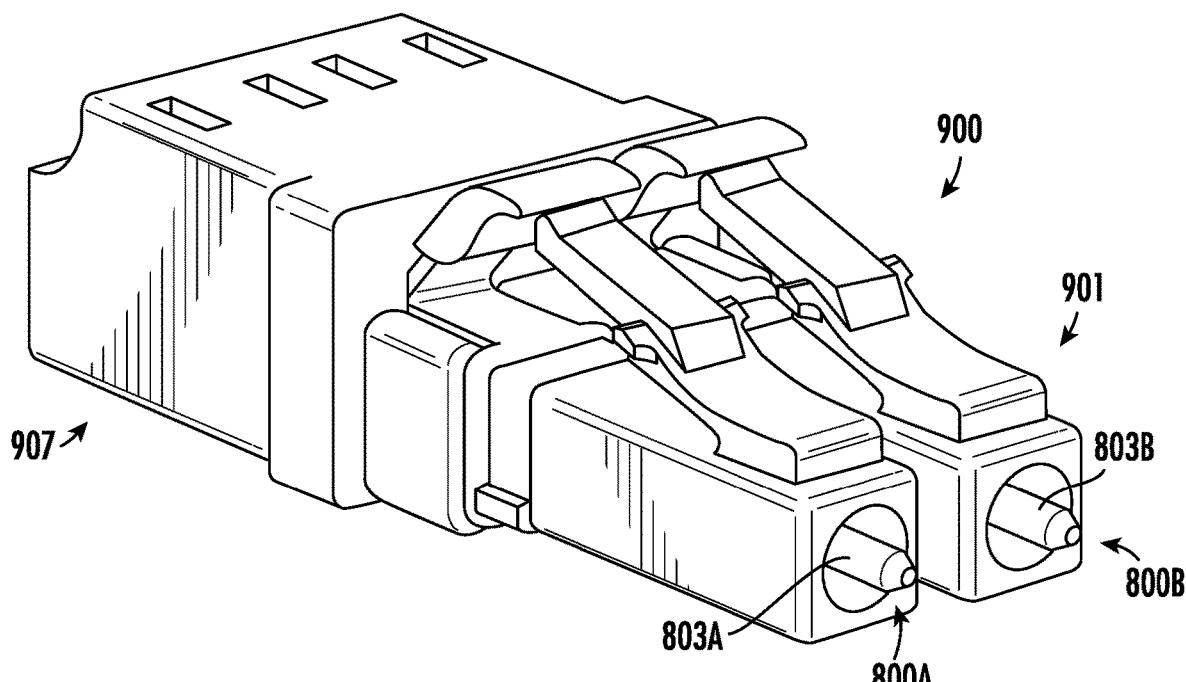
FIG. 21 schematically illustrates the two multicore optical fiber connector adapters of FIG. 20A or 20B disposed in a connector body according to one or more embodiments described and illustrated herein.
Figure 22:
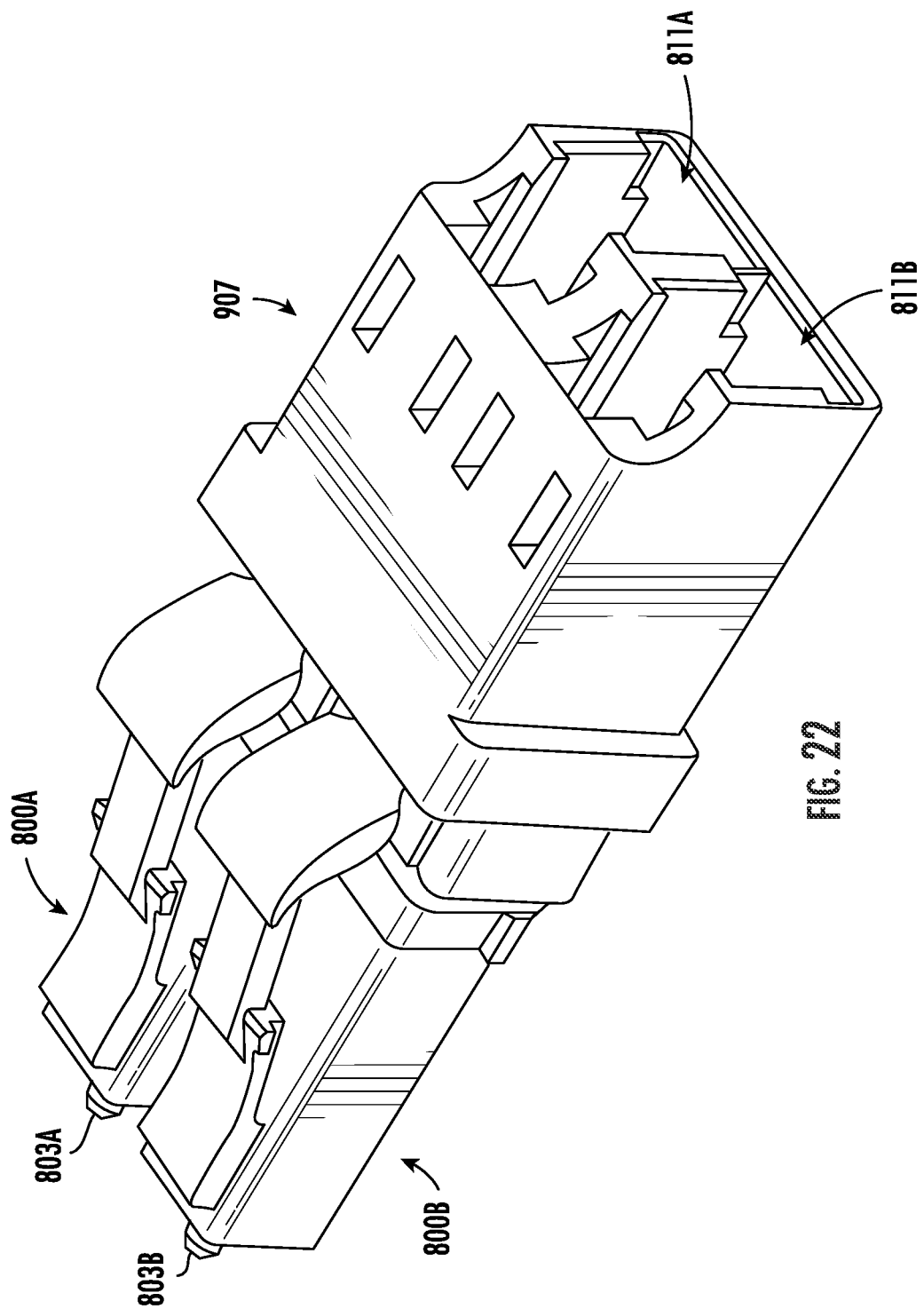
FIG. 22 schematically illustrates a rear view of the two multicore optical fiber connector adapters in a connector body shown in FIG. 21.

FIG. 21 illustrates an example adapter comprising a duplex connector body 900 that maintains the first and second adapters 800A, 800B illustrated by FIG. 20A. The connector boy 900 has a first end 901 that is configured as a multicore connector end that is operable to receive two connectors having a multicore optical fiber. As shown in FIG. 21, first and second multicore ferrules 803A, 803B are provided at the first end 901 of the connector body 900. The second end 907 of the connector body 900 is configured as a multi-fiber connector end operable to receive two connectors having a set of optical fibers (e.g., four optical fibers).

It should now be understood that embodiments of the present disclosure are directed to MCF stubs, multicore fan-in, fan-out devices, as well as adapters that incorporate one or more MCF stubs. The multicore fan-in, fan-out devices described herein have smaller footprints compared with previous fan-in, fan-out devices using tapered preforms. As a non-limiting example, the cross section of the fan-in, fan-out device may be only 0.5 mm at its largest diameter. The smaller taper ratio of the devices disclosed herein translates to shorter overall length. The taper and splices may be kept straight in the package without tension. The small footprint of the MCF stubs described herein enable them to be incorporated into connectors having a small form factor, such as LC connectors. The connectors may be used to fabricate optical adapters to connector single-core optical fibers to a multicore optical fiber.

It is noted that recitations herein of a component of the embodiments being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that one or more of the following claims utilize the term "wherein" as a transitional phrase. For the purposes of defining the embodiments of the present disclosure, it is noted that this term is introduced in the claims as an open-ended transitional phrase that is used to introduce a recitation of a series of characteristics of the structure and should be interpreted in like manner as the more commonly used open-ended preamble term "comprising."

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:

1. A multicore optical fiber connector adapter comprising:
   at least one multicore optical fiber stub comprising:
   a plurality of optical cores, each optical core having an inner core and an outer core;
   a fiber coupling section having a first diameter, wherein the plurality of optical cores has a first pitch at the fiber coupling section;
   a multicore fiber coupling section having a second diameter that is less than the first diameter, wherein the plurality of optical cores has a second pitch at the multicore fiber coupling section that is less than the first pitch; and
   a taper section between the fiber coupling section and the multicore fiber coupling section;
   at least one multicore ferrule comprising a passageway, wherein at least a portion of the multicore fiber coupling section is disposed within the passageway;
   a multicore connector, wherein the at least one multicore ferrule is disposed within the multicore connector;
   a plurality of optical fibers, wherein a first end of the plurality of optical fibers is optically coupled to the plurality of optical cores at the fiber coupling section; and
   a multi-fiber ferrule, wherein a second end of the plurality of optical fibers is disposed within the multi-fiber ferrule.

2. The multicore optical fiber connector adapter of claim 1, wherein the plurality of optical fibers is a plurality of single-core optical fibers.

3. The multicore optical fiber connector adapter of claim 2, wherein each single-core optical fiber of the plurality of single-core optical fibers comprises:
   an inner core;
   an outer cladding; and
   a titanium doped stress layer in the outer cladding, wherein the outer cladding of each single-core optical fiber is in contact with the outer claddings of adjacent single core optical fibers.

4. The multicore optical fiber connector adapter of claim 1, wherein the second ends of the plurality of optical fibers are arranged in an array at a face of the multi-fiber ferrule.

5. The multicore optical fiber connector adapter of claim 1, wherein the first end of the plurality of optical fibers is optically coupled to the plurality of optical cores at the fiber coupling section by a fusion splice.

6. The multicore optical fiber connector adapter of claim 1, wherein:
the at least one multicore ferrule comprises a first multicore ferrule and a second multicore ferrule;
the at least one multicore optical fiber stub comprises a first multicore optical fiber stub and a second multicore optical fiber stub;
the multicore fiber coupling section of the first multicore optical fiber stub is disposed in the first multicore ferrule and the multicore fiber coupling section of the second multicore optical fiber stub is disposed in the second multicore ferrule;
the plurality of optical fibers comprises a first set of optical fibers and a second set of optical fibers; and
the first end of the first set of optical fibers is optically coupled to the plurality of optical cores at the fiber coupling section of the first multicore optical fiber stub and the first end of the second set of optical fibers is optically coupled to the plurality of optical cores at the fiber coupling section of the second multicore optical fiber stub.

7. The multicore optical fiber connector adapter of claim 6, wherein the multicore connector is a duplex connector.

8. The multicore optical fiber connector adapter of claim 1, further comprising a ferrule holder, wherein the at least one multicore ferrule is disposed within the ferrule holder and the ferrule holder comprises an extended portion such that at least a portion of the taper section and the fiber coupling section are disposed in a passageway of the extended portion.

9. The multicore optical fiber connector adapter of claim 1, further comprising an adapter housing having a first end and a second end, and a multi-fiber connector body, wherein:
the first end of the adapter housing is coupled to the multicore connector; and
the second end of the adapter housing is coupled to the multi-fiber connector body.

10. The multicore optical fiber connector adapter of claim 1, wherein the plurality of optical fibers is disposed within an optical cable jacket.

11. The multicore optical fiber connector adapter of claim 1, wherein:
each core at the fiber coupling section has a first index profile with three regions; and
each core at the multicore fiber coupling section has a second index profile with three regions.

12. The multicore optical fiber connector adapter of claim 11, wherein:
an inner core index region of the first index profile is shorter in length than an inner core index region of the second index profile; and
an outer core index region of the second index profile is shorter in length than an outer core index region of the second index profile.

13. The multicore optical fiber connector adapter of claim 11, wherein a diameter of the fiber coupling section is less than or equal to 400 µm.

14. The multicore optical fiber connector adapter of claim 11, wherein a length of the taper section is less than 10 mm.

15. The multicore optical fiber connector adapter of claim 11, wherein the taper section provides an adiabatic taper for the plurality of optical cores.

16. The multicore optical fiber connector adapter of claim 11, wherein a mode field diameter of each core of the plurality of optical cores at the fiber coupling section is within 1 µm of a mode field diameter of each core of the plurality of optical cores at the multicore fiber coupling section.

17. A multicore optical fiber connector adapter comprising:
at least one multicore optical fiber stub comprising:
a plurality of optical cores, each optical core having an inner core and an outer core;
a fiber coupling section having a first diameter, wherein the plurality of optical cores has a first pitch at the fiber coupling section;
a multicore fiber coupling section having a second diameter that is less than the first diameter, wherein the plurality of optical cores has a second pitch at the multicore fiber coupling section that is less than the first pitch; and
a taper section between the fiber coupling section and the multicore fiber coupling section;
at least one multicore ferrule comprising a first passageway, wherein at least a portion of the multicore fiber coupling section is disposed within the first passageway;
at least one fiber coupling ferrule comprising a second passageway, wherein at least a portion of the fiber coupling section is disposed within the second passageway;
a ferrule holder comprising a first end and a second end, wherein the at least one multicore ferrule is disposed in the ferrule holder at the first end and the at least one fiber coupling ferrule is disposed within the ferrule holder at the second end; and
a connector body, wherein the at least one multicore ferrule, the at least one fiber coupling ferrule, and the ferrule holder are disposed within the connector body.

18. The multicore optical fiber connector adapter of claim 17, wherein:
the at least one multicore ferrule comprises a first multicore ferrule and a second multicore ferrule;
the at least one multicore optical fiber stub comprises a first multicore optical fiber stub and a second multicore optical fiber stub;
the at least one fiber coupling ferrule comprise a first fiber coupling ferrule and a second fiber coupling ferrule;
the multicore fiber coupling section of the first multicore optical fiber stub is disposed in the first multicore ferrule and the multicore fiber coupling section of the second multicore optical fiber stub is disposed in the second multicore ferrule; and
the fiber coupling section of the first multicore optical fiber stub is disposed in the first fiber coupling ferrule and the fiber coupling section of the second multicore optical fiber stub is disposed in the second fiber coupling ferrule.

19. The multicore optical fiber connector adapter of claim 18, wherein the connector body is configured as a duplex connector.

20. The multicore optical fiber connector adapter of claim 17, wherein:
each core at the fiber coupling section has a first index profile with three regions; and
each core at the multicore fiber coupling section has a second index profile with three regions.

21. The multicore optical fiber connector adapter of claim 20, wherein:
an inner core index region of the first index profile is shorter in length than an inner core index region of the second index profile; and
an outer core index region of the second index profile is shorter in length than an outer core index region of the second index profile.

22. The multicore optical fiber connector adapter of claim 20, wherein a diameter of the fiber coupling section is less than or equal to 400 µm.

23. The multicore optical fiber connector adapter of claim 20, wherein a length of the taper section is less than 10 mm.

24. The multicore optical fiber connector adapter of claim 20, wherein the taper section provides an adiabatic taper for the plurality of optical cores.

25. The multicore optical fiber connector adapter of claim 20, wherein a mode field diameter of each core of the plurality of optical cores at the fiber coupling section is within 1 µm of a mode field diameter of each core of the plurality of optical cores at the multicore fiber coupling section.

* * * * *